United States Patent
Nakano et al.

(10) Patent No.: US 7,440,372 B2
(45) Date of Patent: Oct. 21, 2008

(54) INFORMATION RECORDING MEDIUM RECORDING METHOD, INFORMATION RECORDING/PLAYBACK APPARATUS, AND INFORMATION RECORDING MEDIUM

(75) Inventors: Masaki Nakano, Tokyo (JP); Masatugu Ogawa, Tokyo (JP); Hideo Sano, Tokyo (JP); Naoto Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 11/136,672

(22) Filed: May 25, 2005

(65) Prior Publication Data

US 2005/0265199 A1      Dec. 1, 2005

(30) Foreign Application Priority Data

May 27, 2004    (JP) ............................. 2004-157797

(51) Int. Cl.
*G11B 7/00* (2006.01)
(52) U.S. Cl. ................. 369/53.12; 369/44.32
(58) Field of Classification Search ............... 369/47.1, 369/47.27, 47.28, 47.5, 47.53, 53.12, 53.13, 369/53.14, 53.15, 44.32
See application file for complete search history.

(56) References Cited

U.S. PATENT DOCUMENTS 7,038,869 B2 *   5/2006   Miyashita et al. ............ 360/31

FOREIGN PATENT DOCUMENTS

| JP | 9-171632    | 6/1997  |
|----|-------------|---------|
| JP | 9-282665    | 10/1997 |
| JP | 2001-283439 | 10/2001 |
| JP | 2002-197660 | 7/2002  |
| JP | 2003-281720 | 10/2003 |
| JP | 2003-331428 | 11/2003 |

OTHER PUBLICATIONS

Working Draft INCITS XXX T10/1545-D Revision 2g; Jan. 14, 2004; Information Technology—Multimedia Commands—4 (MMC-4).

"Proposal for a Small Form Factor Committee Specification of: Mt. Fuji Commands for Multimedia Devices"; SFF8090i V5; Revision 1.3; Apr. 18, 2001.

* cited by examiner

*Primary Examiner*—Nabil Z Hindi
(74) *Attorney, Agent, or Firm*—Dickstein Shapiro LLP

(57) ABSTRACT

In an information recording medium recording method, recording is interrupted, in recording on an information recording medium, when a predetermined interruption condition is met. A signal recorded in a recorded area is played back and a recording signal playback waveform signal is obtained. Error information indicating an error between a reference waveform signal derived by partial response equalization of a data string and the recording signal playback waveform signal is obtained. A recording condition is corrected on the basis of the error information. A recording/playback apparatus and information recording medium are also disclosed.

26 Claims, 24 Drawing Sheets

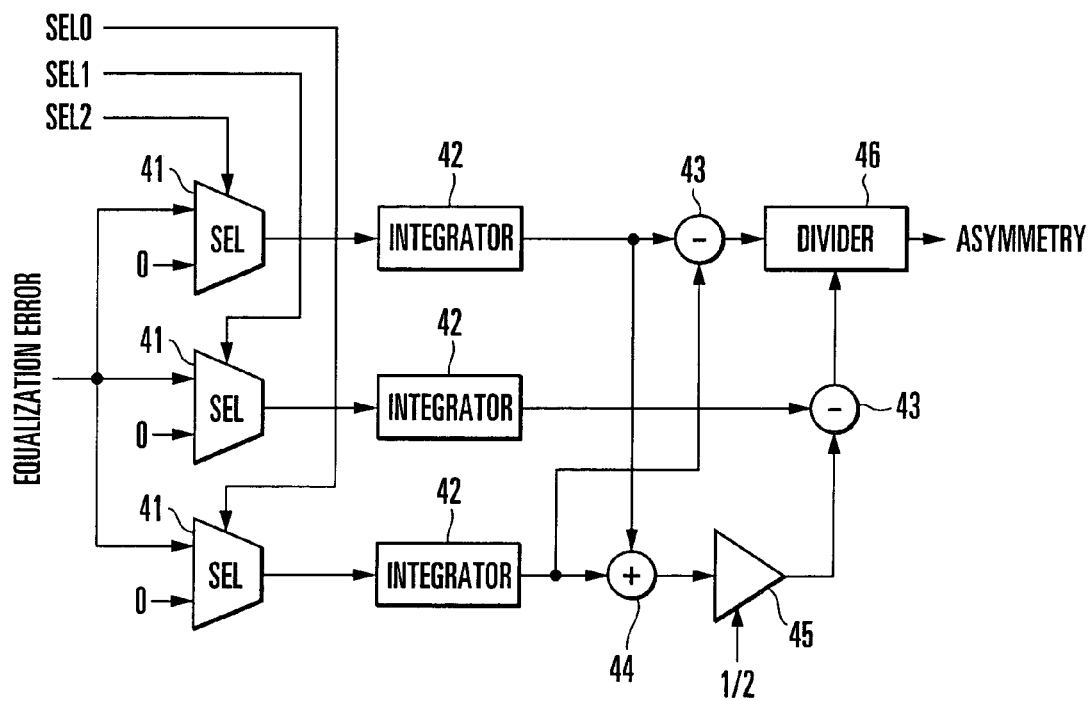
F I G. 14

INFORMATION RECORDING MEDIUM RECORDING METHOD, INFORMATION RECORDING/PLAYBACK APPARATUS, AND INFORMATION RECORDING MEDIUM

BACKGROUND OF THE INVENTION

The present invention relates to an information recording medium recording method, information recording/playback apparatus, and information recording medium and, more particularly, to a recording method of stabilizing continuous recording on a high-density information recording medium, an information recording/playback apparatus using the method, and an information recording medium on which recording is performed by the recording method and recording/playback apparatus.

With the diversification of information, data handled in the storage field have also increased in amount. In the field of optical disks as well, efforts have been made to achieve an increase in capacity by increasing densities from those of CDs to those of DVDs. As attempts to develop techniques toward higher density, there have been developed a technique of accurately recording marks as small as possible and a technique of allowing playback even near an optical playback limit. Conventional recordable DVDs will be described first.

Conventionally, as recordable DVDs, optical disks such as DVD–RAMs, DVD–Rs, DVD–RWs, DVD+Rs, and DVD+RWs have already been on the market. Optical disk apparatuses which record and play back on these disks include an apparatus having a recording speed as high as octuple speed. Note, however, that such an apparatus cannot record on the entire disk layer at the highest speed. Instead, the disk layer is divided into several areas in the direction from the inner circumference to the outer circumference, and the apparatus changes the linear speed in the respective areas so as to execute recording at speeds as high as possible. Such an optical disk has an area (PCA: Power Calibration Area) for adjusting recording power on a portion of the disk area. The apparatus is designed to properly perform recording power adjustment (OPC: Optimum Power Control) by using this area.

The optical disk apparatus records actual data by using the recording power obtained at this point of time. As recording power adjustment methods, there are known the β method of obtaining a β value by checking asymmetry on the basis of the playback amplitude of a long mark and the playback amplitude of a short mark and the γ method of determining a state from the degree of saturation of a recording mark amplitude. The written standards concerning 2× (double speed) of a DVD–RW disk describe the OPC flag indicating the necessity of a change in asymmetry value by 5% or more with a change of 15% in recording power as the accuracy of the change amount of β value when the β method is used.

In actual recording, recording performance is maintained by using a technique called R-OPC (Running-OPC). According to this technique, at the time of OPC in a PCA, the amount of light returned from the disk during recording is measured, the amount of return light at the time of the optimal β value is set as a target value, and the recording power is changed to make the amount of return light during actual data recording become equal to the target value.

Playback techniques will be described next. Conventionally, a slice identification scheme has been used for the binarization of data. This technique has used a technique of filtering a playback waveform by using an equalizer so as to reduce intersymbol interference. In this case, the equalizer suppresses intersymbol interference but increases noise components. This makes it difficult to decode recorded original data from a playback signal at the time of high density.

In contrast, as a technique of accurately decoding data recorded at a high density, the PRML (Partial-Response Maximum-Likelihood) technique is effective. In this technique, partial response (to be abbreviated as PR hereinafter in some cases) equalization (PR equalization) of a playback waveform is performed to obtain a waveform having intersymbol interference so as not to increase noise components, and data identification is executed by a technique called Viterbi decoding (ML). PR equalization is defined by an amplitude for every data period (clock). For example, PR(abc) indicates that the amplitude at time 0 is represented by a, the amplitude at time T is represented by b, the amplitude at time 2T is represented by c, and the amplitude at other times is 0. The total number of components with amplitudes other than 0 is called a constraint length. In order to increase density, it is effective to use a partial response waveform with a long constraint length. In contrast, using a waveform with a long constraint length is premised on the use of a waveform with large intersymbol interference.

The PR(1, 2, 2, 2, 1) characteristic will be described as an example. The PR(1, 2, 2, 2, 1) characteristic indicates a characteristic in which a playback signal with respect to code bit "1" is represented by "12221". Convolution computation of a code bit sequence and sequence 12221 representing a PR characteristic generates a playback signal.

For example, a playback signal with respect to code bit sequence 0100000000 is represented by 0122210000. Likewise, a playback signal with respect to code bit sequence 0110000000 is represented by 0134431000; a playback signal with respect to 0111000000, 0135653100; a playback signal with respect to 0111100000; 00135775310; and playback signal with respect to 0111110000, 0135787531. According to the PR(1, 2, 2, 2, 1) characteristic, playback signals have nine levels. The playback signal calculated by such convolution computation is an ideal playback signal (path).

A playback signal, however, does not necessarily have the PR(1, 2, 2, 2, 1) characteristic, and contains deterioration factors such as noise. In PRML detection, therefore, a playback signal is approximated to the PR characteristic by an equalizer (a playback signal approximated to the PR characteristic will be referred to as an equalized playback signal). Thereafter, a Viterbi decoder is used to select a path with the shortest Euclidean distance from the equalized playback signal. This path has a one-to-one relationship with a code bit sequence. The Viterbi decoder which performs Viterbi decoding operation outputs a code bit sequence corresponding to the selected path as decoded binary data. A system using PRML is based on the premise that a playback signal is a ternary or higher-order signal, so-called a multilevel signal, instead of a binary signal. In slice identification detection, the presence/absence of a pit is determined on a proper slice, and data is played back upon binary equalization. Therefore, in PRML detection premised on multilevel signals, unlike in the former case, recording/playback waveforms must conform to PRML detection.

FIG. 29 shows examples of measurement of error rates in cases wherein conventional binary equalization with slice identification is used and conventional PRML detection is used while the pit length is changed. The broken line represents the error rates in binary equalization; the chain line, an allowable value reference for an apparatus; λ, the laser wavelength of a light source; and NA, the numerical aperture of an objective lens. It is obvious from FIG. 29 that conventional PRML detection can perform playback with smaller pits, and the shortest pit length in slice identification is limited at about 0.35×λ/NA. Note that the pit lengths in conventional DVDs are about 0.37×λ/NA.

In Japanese Patent Laid-Open No. 2002-197660, the inventor of the present application discloses a detection means corresponding to an asymmetry in a case wherein PRML detection is used. In this case, an asymmetry detection circuit includes a timing adjustment circuit which receives a digitized sample value, a Viterbi detector which receives the sample value, a reference level determining device which receives the Viterbi detector output, a filter circuit which receives the Viterbi detector output, an error calculator which calculates the difference between the filter circuit output and the timing adjustment circuit output, a plurality of discrimination circuits each of which receives the reference level determination circuit output as a discrimination signal and discriminates the error calculator output, a plurality of integration circuits which integrate the plurality of discrimination circuit outputs, an average calculation circuit which calculates the average of the maximum reference level integrated value and the minimum reference level integrated value of the integration circuit outputs, and a circuit which executes the operation of calculating the difference between the average value and the median reference level integrated value of a plurality of reference level integrated values.

Even if the recording power of laser light is optimal at the start of data recording, the power may deviate from the optimal state during recording due to various factors caused by the characteristics of the disk medium itself and the use state of the optical disk apparatus. That is, different situations may occur within a single disk depending on the place (area) and the state of the apparatus. In this case, the recording quality deteriorates in such a portion. In addition, correction by conventional R-OPC cannot cope with such a problem.

In order to keep recording quality constant, for example, Japanese Patent Laid-Open No. 2003-331426 discloses an optical disk apparatus which stops recording and obtains recording power again during data recording on an optical disk, and resumes recording with the obtained recording power of laser light, an optical disk apparatus which stops recording during execution of recording on an optical disk, detects the recorded state of the data, and obtains the recording power of the laser light again on the basis of the detection result, and an optical disk apparatus in which power is determined on the basis of the relationship between a recording state and recording power at the time of OPC, and if the recording state exceeds an allowable range, power is obtained again, and if the recording state falls within the allowable range, recording is resumed without any change in power. According to this reference, the timing of calculating recording power again and the number of times recording power is calculated are not limited, and are properly set as needed. That is, such calculation is performed randomly at arbitrary timings, e.g., at predetermined time intervals or every time a predetermined amount of data is recorded.

In a case wherein this technique is used, a β value is exemplified as a state detection value derived from a playback signal (HF signal) read out from an optical disk.

According to Japanese Patent Laid-Open No. 2003-281720, when the recording power corrected by R-OPC reaches the maximum value, recording operation is interrupted, and resumed after a lapse of a predetermined period of time. In addition, when the interruption exceeds a predetermined period of time, an error is notified to a host apparatus.

The relationship between an information recording/playback apparatus which actually performs recording/playback and a host system which transmits a command to record information and information to be recorded will be described, especially in a case wherein the apparatus is operated by using the drive control command described in ANSI.T10/1545-D or SFF8090i. A convention by which a constant recording rate is expected with the MMC command will be described. In general, a host application uses the command "Getperformance" to check the maximum speed at which recording can be done from the apparatus to a disk. The host application then uses SetStreaming command to determine how many Kbytes of data should be supplied per unit time. At this time, Streaming bit assigned to the seventh bit of the 10th byte of WRITE (12) command is set to 1. When this Streaming bit is effective ("1"), the host application operates on the assumption that the apparatus guarantees that the transfer rate is kept constant.

First of all, the results confirmed by the inventor of the present application and the like will be presented. The following is the experimental result in which conventional β values were obtained when the power was changed at a shortest bit length of 0.13 µm/bit in (1, 7) RLL with respect to a phase-change disk having a substrate thickness of 0.6 mm with an NA of 0.65 (of the objective lens of an optical head) and an LD wavelength λ of 405 nm. Referring to FIG. 17, each black circle (solid line) represents a bER (bit error rate), each black triangle (chain line) represents β obtained by the conventional technique, and each black rectangle (broken line) represents β detected by a detection arrangement suitable for high density, which is expressed by β2. In this arrangement, data was not able to be accurately played back without using the PRML detection technique. As shown in FIG. 17, obviously, when data is recorded at a density high enough to use PRML detection, the detection accuracy in the conventional detection method lacks 5% or less with respect to a change of 15% in recording power. It is impossible to keep the recording quality constant using this, thus posing a problem in high-density recording/playback operation.

The β value of a playback signal is not an index indicating the absolute value of performance. FIG. 18 shows an example of actual measurement on the correspondence between β values with respect to powers and bit error rates. Even with the same β value, the minimum values of bit error rates do not coincide with each other, and the margin curves represented by error rates are not in a one-to-one correspondence with β value deviations in some cases. Obviously, therefore, a β value is an index which well represents a relative amount indicating a power deviation but is not good at representing the absolute value of performance. That is, a β value deviation may not indicate how much the absolute value of performance deteriorates.

In addition, there is no ground for a criterion for determination as to the timing of correcting the recording power. Since there is no inevitability about the execution of correction at predetermined time intervals or for each predetermined data amount, unnecessary operation must be executed.

Furthermore, consider an optical disk apparatus which interrupts and resumes operation. It is a problem for a host system which exchanges information with such an optical disk apparatus that the state of the apparatus is unknown, because the apparatus does not operate independently. Assume that the host system operates the apparatus by using the drive control command described in ANSI.T10/1545-D or SFF8090i (Mt. Fuji). In this case, when the apparatus interrupts upon executing interruption operation or the like, the host system cannot record data at a predetermined rate in spite of the fact that the host system expects to perform recording at the predetermined rate. In such a case, i.e., a case wherein a response indicating the reason for interruption is not returned, since the overall system does not stop, the host system generally performs operation such as stopping the apparatus due to a timeout error or the like or performing an alternative procedure upon autonomously determining another reason. As a result, unexpected operation may occur, and desired operation cannot be done, leading to the failure of the apparatus.

SUMMARY OF THE INVENTION

It is a principal object of the present invention to provide an information recording medium recording method which can always write information by continuous recording, in an optical disk apparatus designed to perform recording/playback, under optimal recording conditions with accuracy higher than that in the prior art, and can record information while keeping its recording quality constant, an information recording/playback apparatus using the recording method, and an information recording medium on which recording is performed by the recording method or information recording/playback apparatus.

It is another object of the present invention to provide an information recording medium recording method which can execute interruption and resumption at efficient timings and intervals, in an optical disk apparatus designed to perform recording/playback accompanied by recording interruption and resumption in data recording, an information recording/playback apparatus using the recording method, and an information recording medium on which recording is performed by the recording method or information recording/playback apparatus.

It is still another object of the present invention to provide a mechanism which can avoid troubles in the exchange of information with a host control system in an information recording medium recording method which can always write information by continuous recording, in an optical disk apparatus designed to perform recording/playback, under optical recording conditions, and can record information while keeping its recording quality constant, and an information recording/playback apparatus using the recording method.

It is still another object of the present invention to provide an information recording medium recording method which can always write information by continuous recording, in an optical disk apparatus designed to record/play back pits with the pit length of a shortest mark or space to be recorded being smaller than $0.35 \times \lambda/NA$, under optimal recording conditions with accuracy higher than that in the prior art, and can record information while keeping its recording quality constant, an information recording/playback apparatus using the recording method, and an information recording medium on which recording is performed by the recording method or information recording/playback apparatus.

According to the present invention, in order to achieve the above objects, there is provided an information recording medium recording method comprising the steps of interrupting recording, in recording on an information recording medium, when a predetermined interruption condition is met, playing back a signal recorded in a recorded area and obtaining a recording signal playback waveform signal, obtaining error information indicating an error between a reference waveform signal derived by partial response equalization of a data string and the recording signal playback waveform signal, and correcting a recording condition on the basis of the error information.

BRIEF DESCRIPTION OF THE DRAWINGS

FIG. 14 is a circuit diagram showing an example of the detailed arrangement of functional blocks for calculating an asymmetry;

DESCRIPTION OF THE PREFERRED
EMBODIMENTS

The embodiments of the present invention will be described below with reference to the accompanying drawings to clarify the above and other objects, characteristics, and merits of the present invention.

First Embodiment

Figure 1:
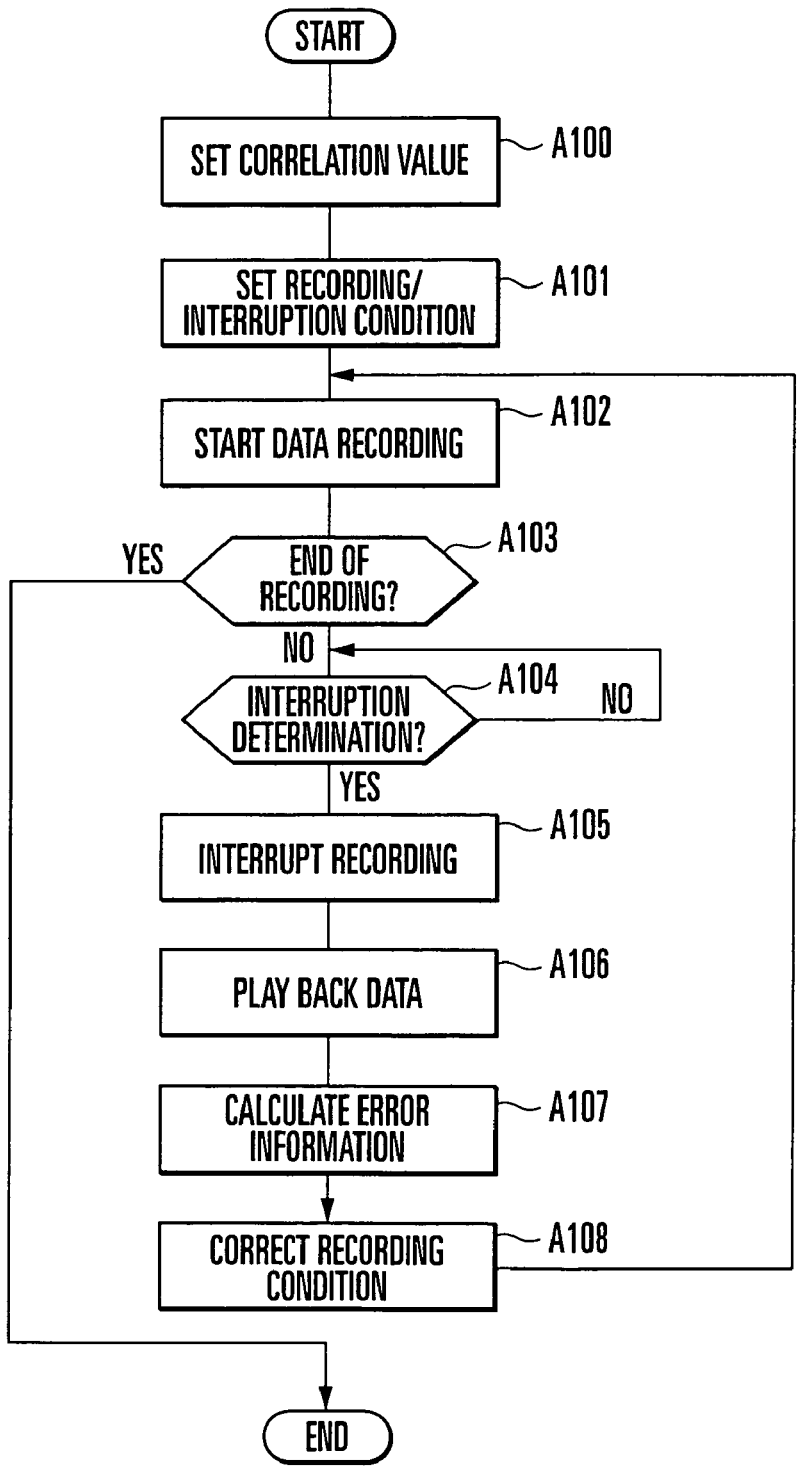
FIG. 1 is a flowchart showing an example of the flow of processing in an information recording/playback method according to the first embodiment of the present invention.

As shown in FIG. 1, an information recording medium recording method according to the first embodiment of the present invention is configured to perform the following processes: correlation value setting A100, recording condition and interruption condition setting A101, data recording starting A102, recording end determination A103, interruption determination A104, recording interruption A105, data playback A106, error information calculation A107, and recording condition correction A108.

In correlation value setting A100, the correlation between error information and recording conditions is set. In recording condition and interruption condition setting A101, power, a recording strategy, and a recording state value are set as recording conditions, and a condition for interrupting data recording is set as an interruption condition.

Conditions for interruption include a case wherein the apparatus state or environmental state changes, a case wherein the state of an optical disk as an information recording medium changes from that at the start of recording, a case wherein a predetermined amount of disk area is used, and the like.

More specifically, the case wherein the apparatus state changes corresponds to a case wherein the number of revolutions changes, and the case wherein the environmental state changes corresponds to a case wherein the temperature changes. Likewise, the case wherein a predetermined amount of disk area is used corresponds to a case wherein recorded data reaches a predetermined amount or a predetermined period of time has elapsed, and the case wherein the state of an optical disk changes from that at the start of recording corresponds to a case wherein a servo parameter such as a focus, track, or aberration, including a tilt, exceeds an allowable value.

In data recording starting A102, run-length-limited recorded/modulated data are started to be recorded in ECC blocks each consisting of, for example, 64 KB. As recording conditions at this time, parameters which the apparatus has in advance or parameters embedded in a disk are used.

In recording end determination A103, it is determined whether or not scheduled data recording is ended. If the scheduled data recording is ended, the recording is terminated. If the recording is not ended, the flow advances to the next step.

In interruption determination A104, it is determined whether or not a predetermined interruption condition is met. If the condition is not met, recording is continued. If the condition is met, recording is interrupted (A105). Referring to FIG. 1, if NO in A104, the decision in A104 is executed. However, the flow may return to a step before recording end determination in A103.

In data playback A106, the data which has already been recorded in an area is played back in, for example, ECC blocks. An area from which data is played back is an area in which recording has already been executed, and there is no limitation as to which area is to be used. However, areas from which data are to be played back preferably include an area located immediately before an area in which recording has been interrupted.

In error information calculation A107, the error information of the recording signal is calculated by using the error between the waveform signal of the played-back recording signal and an ideal signal (to be referred to as an estimated reference waveform signal) derived from the partial response characteristic of a data string (to be referred to as an estimated data string) estimated from the waveform signal (to be referred to as the recording signal playback waveform signal) of the played-back recording signal.

Figure 12:
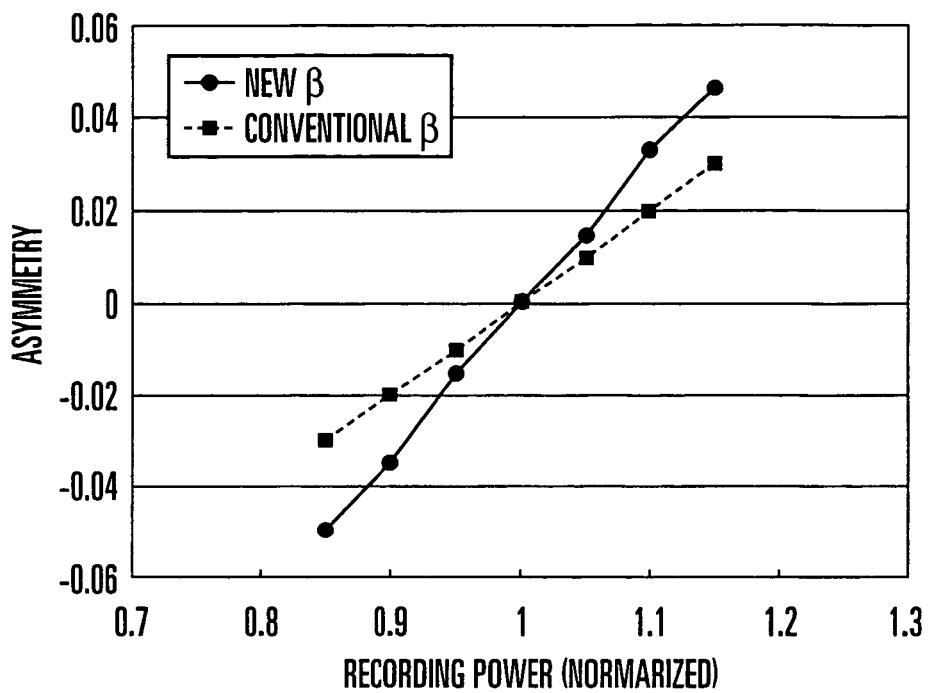
FIG. 12 is a graph showing examples of conventional $\beta$ and new $\beta$ measurement results with respect to changes in power.

As error information, an asymmetry value (new β) (to be described later) and PRSNR value are used. An asymmetry detection method (to be described later) is higher in accuracy than the method based on the conventional β method (FIG. 12). In the asymmetry detection method, as the recording power changes by 15%, the asymmetry changes by 5% or more. FIG. 12 shows the difference between conventional β with respect to changes in power (the broken line with black rectangles in FIG. 12) and new β with respect to changes in power (the solid line with black circles in FIG. 12).

In recording condition correction A108, a recording condition is corrected on the basis of the error information obtained in A107. Correction is performed by using the correspondence between errors and change amounts which the apparatus has in advance. As the recording condition at this point of time, the power or recording waveform shape is changed. If the value of the waveform error obtained in A107 falls within an allowable range, it may be determined that there is no need to change the condition. In addition, this change is generally executed by a controller (CPU). Subsequently, data recording is resumed.

For example, correction based on error information is performed as follows. Assume that it is known in advance that an asymmetry value of 2% is optimal. In this case, if the asymmetry value obtained by measurement is −5%, correction is performed to increase the recording power so as to increase the asymmetry by about 7%. Recording power that may increase the asymmetry by 7% can be obtained by making the apparatus have correlation values between asymmetries and recording powers in advance or may be obtained when an optical disk is loaded into the apparatus.

In recording end determination A103, the presence/absence of data to be recorded is determined. Even if this process is performed after recording condition correction A108, the same effect can be obtained. This arrangement is not directly relevant to the present invention.

In error information calculation A107, although the value of error information itself is used, changes in the value of error information can also be used as information. If, for example, the error information on a played-back ECC block basis falls within a predetermined variation range, the average of the information is used. If error information tends to decrease, playback operation is repeated for the next ECC block. In this case, if error information tends to decrease up to the recording end block, correction can be performed in a feed forward manner by expecting that the error information of blocks scheduled to be recorded next will also decrease. In addition, in this case, it is also obvious that as information necessary for correction, the information of a recording end portion is more important. Error information will be described in detail below.

[Explanation of Asymmetry Calculation]

A waveform error is the difference between a digitized input sample and an ideal waveform (estimated reference waveform signal) derived from predetermined PR equalization of a data string (estimated data string) obtained by processing a recording signal playback waveform signal by using an identification device. Note, however, that this error can be made to become a level corresponding to each multilevel detection level expected in PR equalization by level discrimination. In addition, the respective errors are integrated and averaged to allow easy addition, subtraction, multiplication, and division. This operation will be described with reference to FIG. 13.

Figure 13:
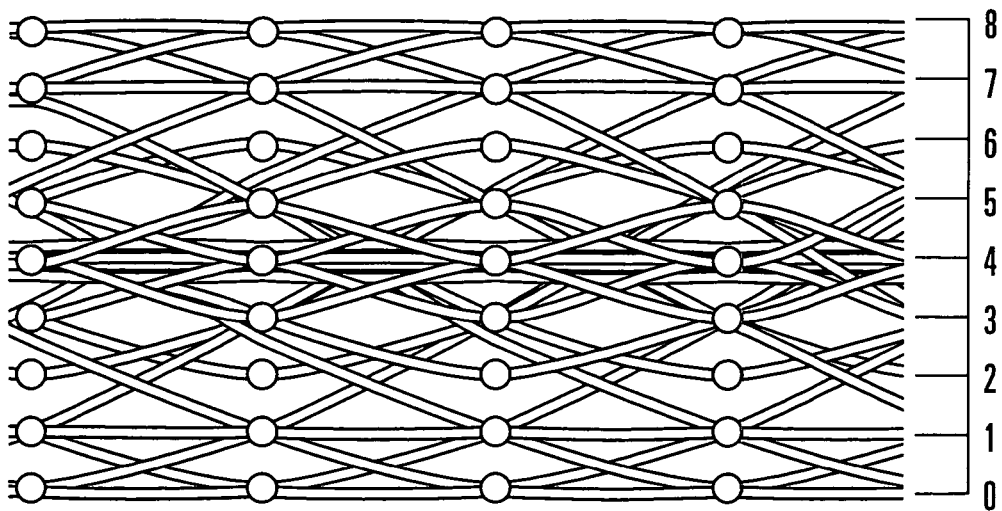
FIG. 13 is a graph showing a nonuple level equalized waveform.

FIG. 13 shows an eye pattern of the played-back equalized waveform of a recording mark string recorded by (1, 7) modulation. As shown in FIG. 13, the waveform is multileveled according to nonuple level. Each white circle represents an identification point for each sample. The integral average of differences between ideal waveforms and digitized playback waveforms at the respective identification points is set as an error. Referring to FIG. 13, the integral average at level "8" is defined as the maximum level: TOP; the integral average at level "0", the minimum level: BOTTOM; and the integral average at level "4", the central level: CENTER. In this case, for example, an asymmetry can be calculated by β=((TOP+BOTTOM)/2−CENTER)/(TOP−BOTTOM).

In addition, CENTER may be the average of the integral average at level "5": LEVEL5 and the integral average at level "3": LEVEL3:

CENTER2=(LEVEL3+LEVEL5)/2

FIG. 14 shows the internal blocks of asymmetry calculator. An asymmetry can be calculated by the function locks shown in FIG. 14.

In ISOM2003 (International Symposium Optical Memory 2003, Technical Digest pp. 164-165 "Signal-to-Noise Ratio in a PRML Detection", S. OHKUBO et al.), as a technique using a waveform error (to be also referred to as an equalization error in some cases), an SNR (Signal-to-Noise Ratio) is estimated as an SNR in a PR system (to be referred to as a PRSNR in some cases) by using a vector representing the difference between paths. This will be described in detail below.

[Explanation of PRSNR]

A detection error tends to occur in Viterbi decoding when the Euclidean distance between paths is short. A Euclidean distance d between different paths is defined as $d2=\Sigma\epsilon i2$, assuming that a polynomial determined by a code bit sequence bk corresponding to one path is expressed by $B(D)=\Sigma bkDk$, a polynomial determined by a code bit sequence ck(bk) (ck is 0 or 1) corresponding to the other path is expressed by $C(D)=\Sigma ckDk$, and $N(D)=(B(D)-C(D))*H(D)=\Sigma\epsilon iDi$ is set as polynomial $H(D)=\Sigma hkDk$ which specifies a partial response. In this case, D is a time delay operator with a channel clock time being a unit, hk is a predetermined partial response characteristic (in this case, h0=1, h1=2, h2=2, h3=2, h4=1, and h5 and subsequent values are all 0), and * represents an operator of convolution computation. The Euclidean distance between paths corresponds to a signal component in a system using the PRML identification scheme.

In a system in which PR(1, 2, 2, 2, 1) characteristic, minimum run-length 1, and recording binary data are combined, $\epsilon i$ exhibiting a short Euclidean distance between paths and d2 have a relationship like that shown in Table 1.

TABLE 1

| Pattern j | $\epsilon_i$ | $d^2$ |
|---|---|---|
| 1 | 1 2 2 2 1 | 14 |
| 2 | 1 2 1 0 −1 −2 −1 | 12 |
| 3 | 1 2 1 0 0 0 1 2 1 | 12 |
| 4 | 1 2 1 0 0 0 0 0 −1 −2 −1 | 12 |
| 5 | 1 2 1 0 0 0 0 0 0 0 −1 −2 −1 | 12 |
| 6 | 1 2 1 0 0 0 0 0 0 0 0 0 1 2 1 | 12 |

Difference $P(D)-Y(D)=\Sigma vkDk$ between polynomial $Y(D)=\Sigma ykDk$ determined by equalized playback signal yk and polynomial $A(D)=\Sigma akDk$ determined by decoded binary data ak is called an equalization error. The influence given on pattern 1 by an equalization error can be expressed by $\Sigma(vk+2vk+1+2vk+2+2vk+3+vk+4)\,2=N*(14R0+24R1+16R2+8R3+2R4)$ $(Ri=\Sigma vkvk+i/N)$ The influence therefore corresponds to a noise component with respect to pattern 1. Likewise, the influences given on patterns 2 and 3 by the equalization error can be expressed by $\Sigma(vk+2vk+1+vk+2-vk+4-2vk+3-vk+4)2=N*(12R0+16R1+2R2-8R3-12R4-8R5-2R6)$ $\Sigma(vk+2vk+1+vk+2+vk+6+2vk+7+vk+8)2=N*(12R0+16R1+4R2+2R4+8R5+12R6+8R7+2R8)$ These influences correspond to noise components with respect to patterns 2 and 3. Therefore, a signal-to-noise ratio S1, which is the SNR of pattern 1, is given by $$S1 = \frac{14 \times 14}{14R_0 + 24R_1 + 16R_2 + 8R_3 + 2R_4}$$
$$= \frac{14}{R_0 + (12R_1 + 8R_2 + 4R_3 + R_4)/7}$$

Likewise, signal-to-noise ratios S2 and S3 of patterns 2 and 3 are given by $$S2 = \frac{12 \times 12}{12R_0 + 16R_1 + 2R_2 - 8R_3 - 12R_4 - 8R_5 - 2R_6}$$
$$= \frac{12}{R_0 + (8R_1 + R_2 - 4R_3 - 6R_4 - 4R_5 - R_6)/6}$$
$$S3 = \frac{12 \times 12}{12R_0 + 16R_1 + 4R_2 + 2R_4 + 8R_5 + 12R_6 + 8R_7 + 2R_8}$$
$$= \frac{12}{R_0 + (8R_1 + 2R_2 + R_4 + 4R_5 + 6R_6 + 4R_7 + R_8)/6}$$

Figure 15:
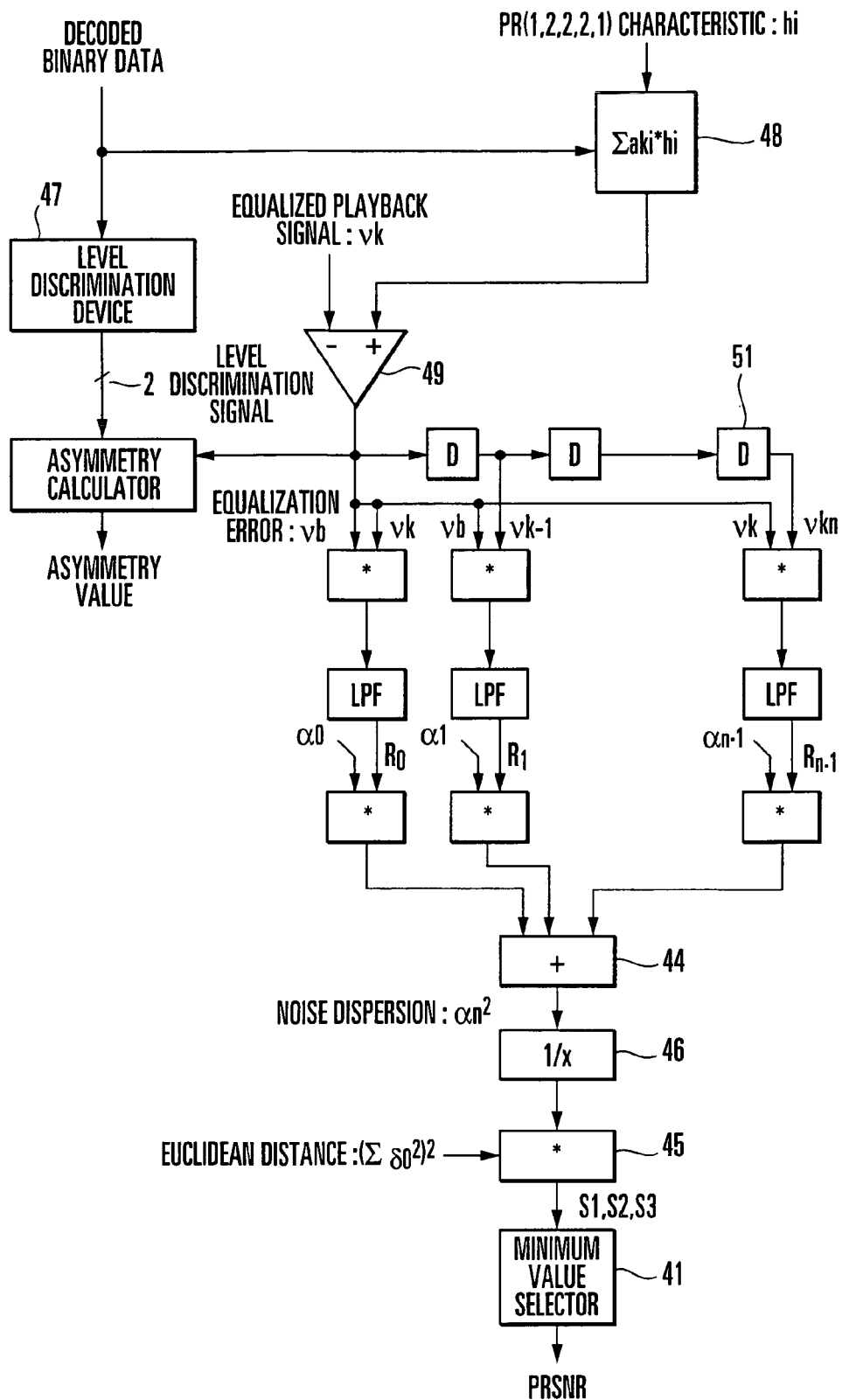
FIG. 15 is a block diagram showing an example of the arrangement of functional blocks for calculating a PRSNR and asymmetry.

The lower the signal-to-noise ratio, the lower the quality of the playback signal. Of S1, S2, and S3, the lowest SNR representing playback signal quality is called PRSNR. FIG. 15 shows the internal blocks of a PRSNR calculator. The above denominators can be calculated by the functional blocks shown in FIG. 15. Referring to FIG. 15, a coefficient αi is a coefficient for a multiplier which performs weighting, and may be set to (14, 24, 16, 8, 2) when the numerator of S1 is set to 14*14. Ri corresponds to the autocorrelation of an equalization error. The higher the PRSNR, the higher the signal quality. Therefore, recording parameters may be adjusted to increase the PRSNR.

The signal-to-noise ratios of patterns 4, 5, and 6 can be obtained in the same manner as described above. Therefore, the signal-to-noise ratios of patterns 1 to 6 can be obtained, and the minimum value of the obtained ratios can be set as a PRSNR. In general, the occurrence probabilities of patterns 4, 5, and 6 are lower than those of patterns 1, 2, and 3. In order to facilitate measurement, therefore, in this embodiment, a PRSNR is obtained from patterns 1, 2, and 3.

In addition, the signal-to-noise ratio of a pattern exhibiting a longer Euclidean distance between paths can be obtained in the same manner as described above. In order to evaluate signal quality more accurately, a PRSNR can be obtained, including signal-to-noise ratios with respect to these patterns. A PRSNR is also well correlated to a bit error rate (BER).

Assume that in calculation of a waveform error, both the asymmetry β using a level error in the second example described above and a PRSNR indicating an SNR are used. In this case, even when BERs differ from each other with the same gradient of β, a recording state can be detected more accurately. In this case, although β indicates performance, it indicates a relative amount with respect to power better. A PRSNR can be said to be an index well representing performance.

Figure 16:
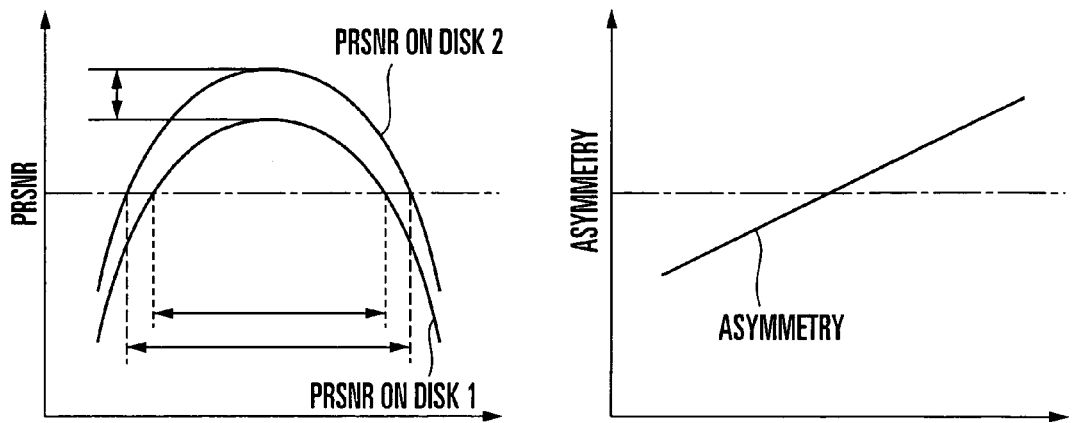
FIG. 16 is a graph showing the relationship between asymmetries and PRSNRs.
Figure 17:
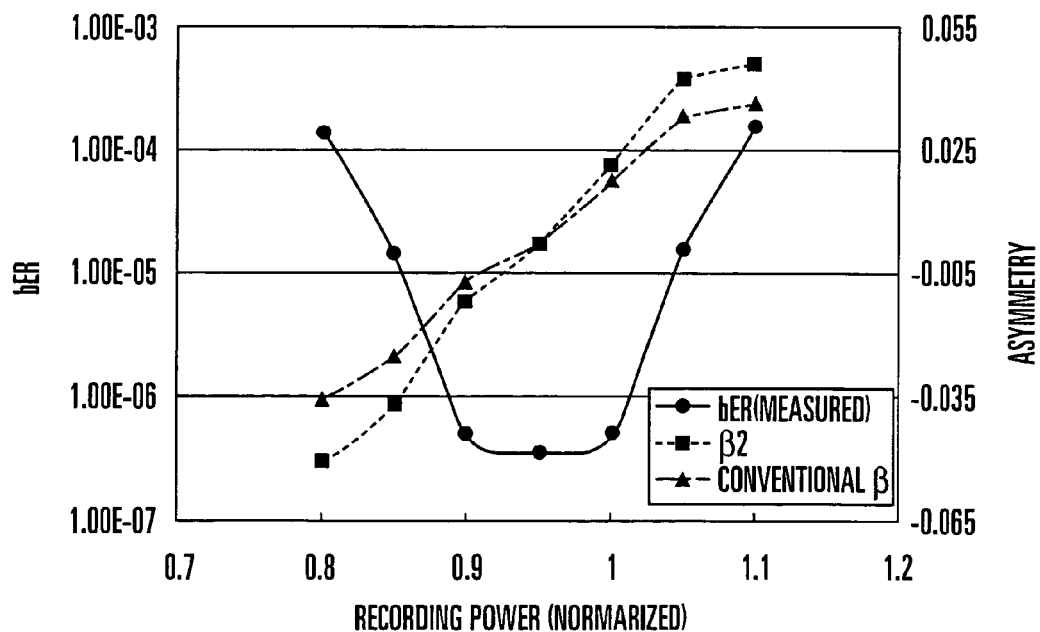
FIG. 17 is a graph showing the correlation between $\beta$ and bER which are calculated from conventional $\beta$ detection and error information.
Figure 18:
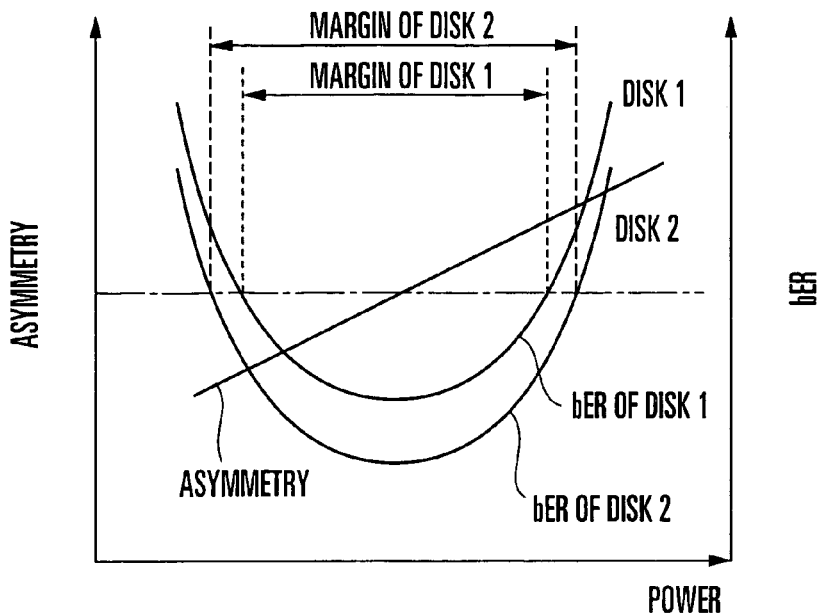
FIG. 18 is a graph showing asymmetries and bERs.

The abscissa in FIG. 16 represents a recoding condition, e.g., a recording power or recording strategy. Although a detailed description of a recording strategy will be omitted because it is not directly relevant to the present invention, when, for example, a pulse train is used, in which recording data are recorded with divided pulses, the recording data differ in the number of pulses and the width of constituent pulses for the respective mark lengths. Parameters for strategies include the width of the start pulse (to be referred to as a Ttop hereinafter), the width of a continuous pulse (multipulse) portion, and the like.

Second Embodiment

Figure 2:
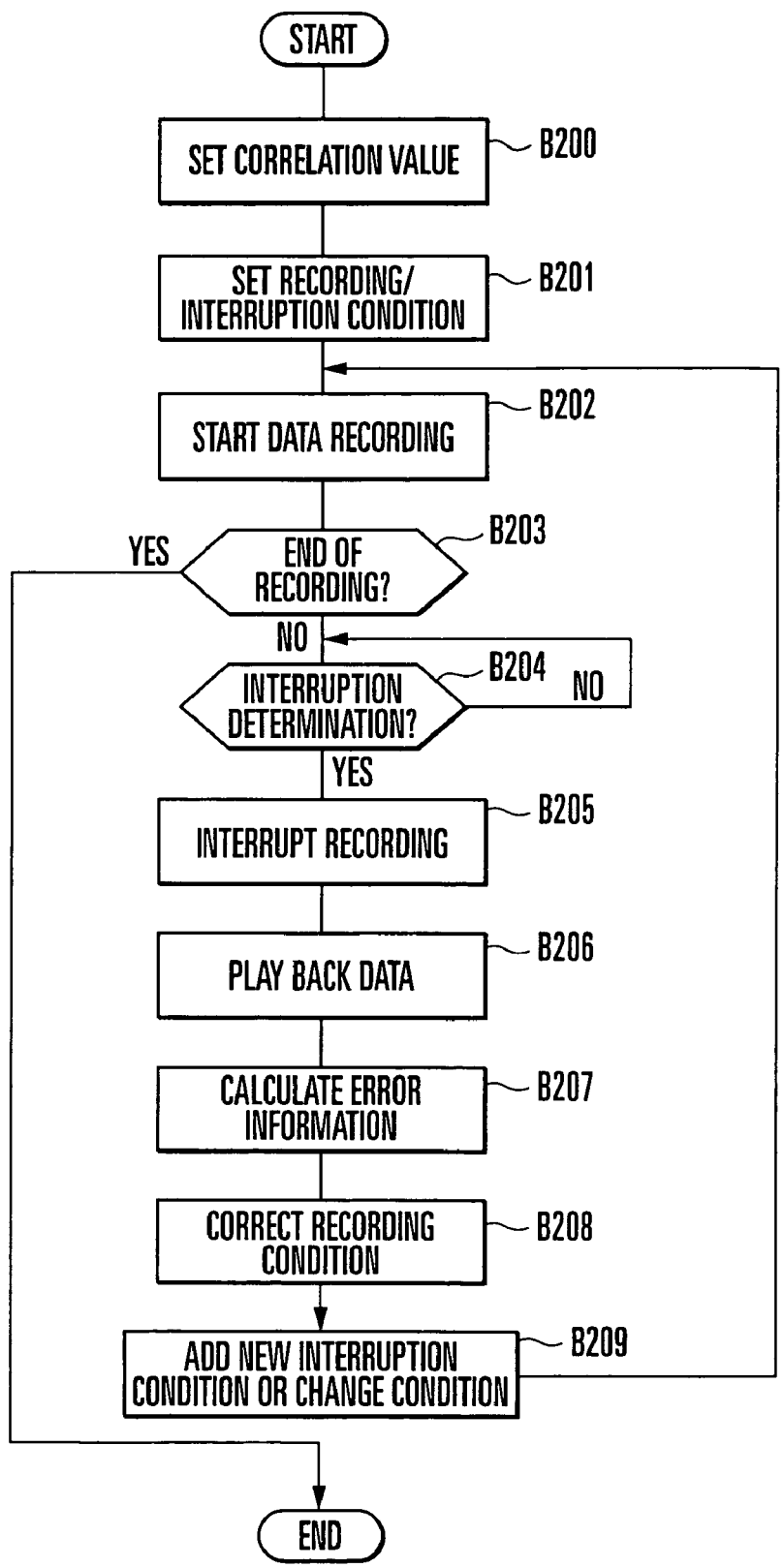
FIG. 2 is a flowchart showing an example of the flow of processing in an information recording/playback method according to the second embodiment of the present invention.

The second embodiment of the present invention will be described next. Although the basic arrangement of the second embodiment is the same as that described above, some contrivance is additionally provided in setting an interruption condition. FIG. 2 shows the arrangement of an information recording medium recording method according to the second embodiment of the present invention. The information recording medium recording method according to the second embodiment is configured to perform the following processes: correlation value setting B200, recording condition and interruption condition setting B201, data recording starting B202, recording end determination B203, interruption determination B204, recording interruption B205, data playback B206, error information calculation B207, new interruption condition addition or condition changing B208, and recording condition correction B209.

In correlation value setting B200, the correlation relationship between error information and recording conditions is set. In recording condition and interruption condition setting B201, power, a recording strategy, and a recording state value are set as recording conditions, and a condition for interrupting data recording is set as an interruption condition.

As in the first embodiment, conditions for interruption include a case wherein the apparatus state or environmental state changes, a case wherein the state of an optical disk as an information recording medium changes from that at the start of recording, a case wherein a predetermined amount of disk area is used, and the like.

More specifically, the case wherein the apparatus state changes corresponds to a case wherein the number of revolutions changes, and the case wherein the environmental state changes corresponds to a case wherein the temperature changes. Likewise, the case wherein a predetermined amount of disk area is used corresponds to a case wherein recorded data reaches a predetermined amount or a predetermined period of time has elapsed, and the case wherein the state of an optical disk changes from that at the start of recording corresponds to a case wherein a servo parameter including a tilt, exceeds an allowable value.

In data recording starting B202, run-length-limited recorded/modulated data are started to be recorded in ECC blocks each consisting of, for example, 64 KB. As recording conditions at this time, parameters which the apparatus has in advance or parameters embedded in a disk are used.

In recording end determination B203, it is determined whether or not scheduled data recording is ended. If the scheduled data recording is ended, the recording is terminated. If the recording is not ended, the flow advances to the next step.

In interruption condition determination B204, it is determined whether or not a predetermined interruption condition is met. If the condition is not met, recording is continued. If the condition is met, recording is interrupted (B205).

In data playback B206, the data which has already been recorded in an area is played back for, for example, each ECC block. An area from which data is played back is an area in which the data has already been recorded, and there is no limitation as to which area is to be used. However, areas from which data is to be played back preferably include an area located immediately before an area in which recording has been interrupted.

In error information calculation B207, the error information of the recording signal is calculated by using the error between the played-back signal and an ideal signal (an estimated reference waveform signal) derived from the partial response characteristic of a data string (an estimated data string) estimated from the waveform signal (the recording signal playback waveform signal) of the played-back recording signal.

In interruption condition addition B208, a recording condition is corrected on the basis of the error information obtained in B207. As the recording condition at this point of time, at least one of the power and recording waveform shape is changed. If the value of the waveform error obtained in B207 falls within an allowable range, it may be determined that there is no need to change the condition. In addition, this change is generally executed by a controller (CPU).

In recording condition correction B209, added is an interruption condition that if the result of error information in S207 exceeds, for example, a predetermined interruption condition change threshold, the amount of data recorded on the disk is changed until the recording operation is interrupted next. This interruption condition to be added may be a change in elapsed time. Alternatively, the amount of disk used or elapsed time as an interruption condition may be set as a parameter, and the parameter may be changed. The flow returns to data recording starting B202 to continue recording.

As information obtained from error information, a PRSNR is effective other than an asymmetry. When operation with a PRSNR of about 15 is compared with operation with a PRSNR of about 25, there is a higher possibility in the former case that even a slight recording power deviation makes it impossible to perform ECC correction.

If, therefore, the PRSNR is low, it is preferable that the number of times the recording operation is interrupted be increased to diligently check the operation. If the PRSNR is about 25, an ECC error does not easily occur from a slight recording power deviation. Therefore, the number of times of checking can be decreased accordingly. In the present invention, a value representing the quality of a signal, e.g., a PRSNR, is also detected, and the frequency of interruption (the number of times of checking) is properly changed in accordance with the detected value, thereby optimizing the recording rate of data and reliability.

In addition, a threshold may be set for an asymmetry value itself. That is, if, for example, the asymmetry value greatly deviates from a proper range, it is obviously conceivable to use a sequence in which the number of times of checking is increased until the asymmetry value is stabilized.

Figure 3:
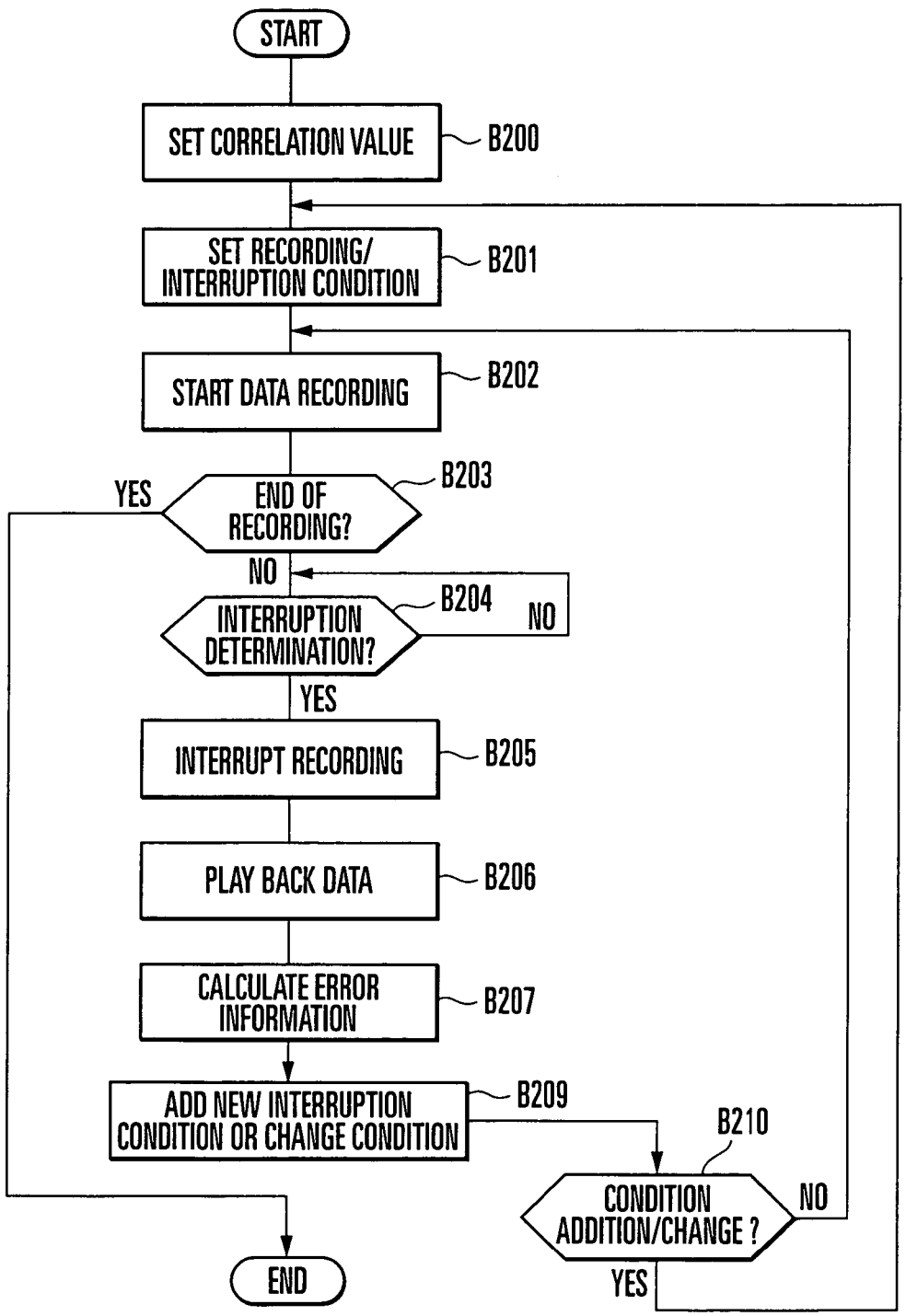
FIG. 3 is a flowchart showing an example of the flow of processing in an information recording/playback method according to the second embodiment of the present invention.

FIG. 3 shows an example in which new interruption condition addition or condition changing B209 in FIG. 2 is replaced with condition addition change determination B210. In condition addition change determination B210, it is determined whether to change a recording condition or interruption condition by using error information. If the condition is not changed, recording is continued under the condition before the interruption. If the condition is to be changed, the recording or interruption condition is corrected by using the correlation in correlation value setting B200.

In this manner, according to this specific example, adding a new interruption condition to a predetermined interruption condition makes it possible to adaptively interrupt and resume recording operation. This allows to perform proper correction at a proper timing, thus stabilizing the recording operation.

Third Embodiment

Figure 4:
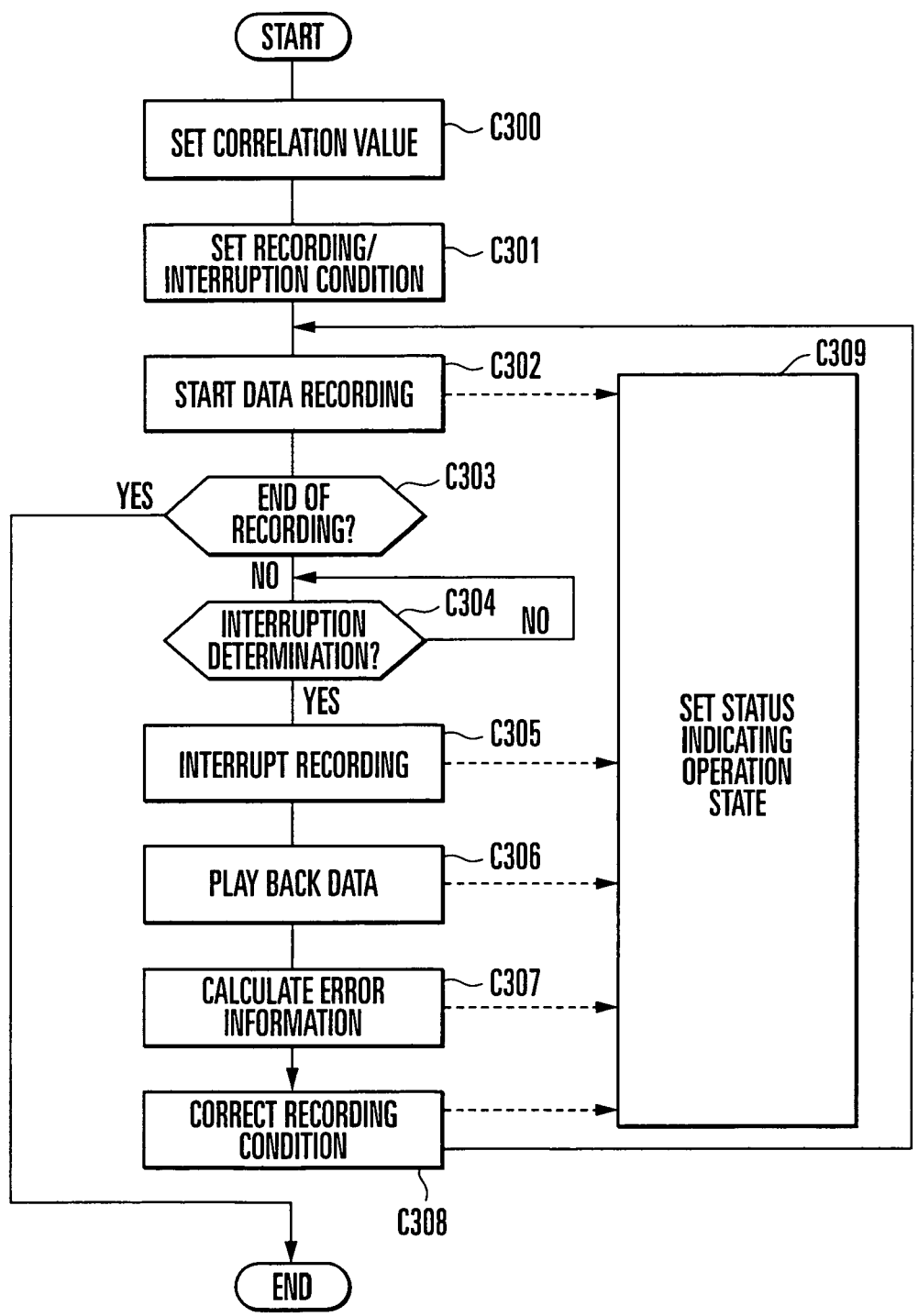
FIG. 4 is a flowchart showing an example of the flow of processing in an information recording/playback method according to the third embodiment of the present invention.

The third embodiment of the present invention will be described next. As shown in FIG. 4, an information recording medium recording method according to the third embodiment of the present invention is configured to perform the following processes: correlation value setting C300, recording condition and interruption condition setting C301, data recording starting C302, recording end determination C303, interruption condition determination C304, recording interruption C305, data playback C306, error information calculation C307, recording condition correction C308, and status setting C309 of indicating at least one of the operation states of C302, C305, and C308.

The relationship between an interruption time and a buffer which prevents data discontinuity will be described below. For example, a recordable DVD apparatus which is currently available on the market for video records video information at a rate of about 8 Mpbs. In contrast, a host system has a buffer with a double capacity of 16 MB to prevent data discontinuity. Consider, for example, an apparatus which can record information at 36 Mbps. In this case, when the transfer rate of a video stream is 22 Mbps (a rate about three times higher than 8 Mbps for a DVD), the size of the buffer is 44 MB when it is estimated from a conventional assignment according to the rate. In this case, there is a margin of 16 sec. If, for example, an interruption of 20 sec is allowed, the necessary buffer capacity corresponds to 55 MB. If a buffer capacity of 64 MB (>55 MB) is prepared, a margin of 23.7 sec is produced. Therefore, with an interruption of about 20 sec, video information can be continuously recorded by using the buffer.

A host system which operates a drive apparatus used the drive control command described in ANSI.T10/1545-D or SFF8090i (Mt. Fuji). Note that an illustration associated with the operation of the host system and a command convention is omitted. When a convention by which a constant recording rate is expected with the MMC command is used, the host system uses the command "Getperformance" to check the maximum speed at which recording can be done from the apparatus to a disk. The host system then uses SetStreaming command to determine how many Kbytes of data should be supplied per unit time. At this time, Streaming bit assigned to the seventh bit of the 10th byte of WRITE (12) command is set to 1. When Streaming bit is effective ("1"), the host system operates on the assumption that the apparatus guarantees that the transfer rate is kept constant. If a data stream is to be interrupted owing to a circumstance on the apparatus side, the apparatus presents the corresponding information to the host system. This makes it possible for the host system to control the buffer and prevent data discontinuity.

Referring to FIG. 4, status setting C309 which indicates an operation state corresponds to C302 and C305 to C308, i.e., a case wherein a data stream is interrupted owing to a circumstance on the apparatus side (to be described below), and corresponds to a portion in which the corresponding status information is returned to the host system. A recording sequence in this embodiment will be described below.

In correlation value setting C300, the correlation between error information and recording conditions is set. In recording condition and interruption condition setting C301, power, a recording strategy, and a recording state value are set as recording conditions, and a condition for interrupting data recording is set as an interruption condition. As in the first and second embodiments, conditions for interruption include a case wherein the apparatus state or environmental state changes, a case wherein the state of an optical disk as an information recording medium changes from that at the start of recording, a case wherein a predetermined amount of disk area is used, and the like. More specifically, the case wherein the apparatus state changes corresponds to a case wherein the number of revolutions changes, and the case wherein the environmental state changes corresponds to a case wherein the temperature changes. Likewise, the case wherein a predetermined amount of disk area is used corresponds to a case wherein recorded data reaches a predetermined amount or a predetermined period of time has elapsed, and the case wherein the state of an optical disk changes from that at the start of recording corresponds to a case wherein a servo parameter including a tilt, exceeds an allowable value.

In data recording starting C302, run-length-limited recorded/modulated data are started to be recorded for each ECC block consisting of, for example, 64 KB. As recording conditions at this time, parameters which the apparatus has in advance or parameters embedded in a disk are used. In addition, status information indicating an operation state is set with respect to the host system.

In recording end determination C303, it is determined whether or not scheduled data recording is ended. If the scheduled data recording is ended, the recording is terminated. If the recording is not ended, the flow advances to the next step.

In interruption determination C304, it is determined whether or not a predetermined interruption condition is met. If the condition is not met, recording is continued. If the condition is met, recording is interrupted (C305). In addition, status information indicating an operation state is set with respect to the host system.

In data playback C306, the data which has already been recorded in an area is played back for, for example, each ECC block. An area from which data is played back is an area in which the data has already been recorded, and there is no limitation as to which area is to be used. However, areas from which data is to be played back preferably include an area located immediately before an area in which playback has been interrupted. In addition, status information indicating an operation state is set with respect to the host system.

In error information calculation C307, the error information of the recording signal is calculated by using the error between the played-back signal and an ideal signal (an estimated reference waveform signal) derived from the partial response characteristic of a data string (an estimated data string) estimated from the waveform signal (the recording signal playback waveform signal) of the played-back recording signal. In addition, status information indicating an operation state is set with respect to the host system.

In recording condition correction C308, a recording condition is corrected on the basis of the error information obtained in C307. As the recording condition at this point of time, at least one of the power and recording waveform shape is changed. The flow then returns to data recording starting C302 to continue recording. At the time of resumption, status information indicating an operation state is set with respect to the host system.

As described above, in this specific example, the information recording apparatus presents the current state to the host system, and hence the host system can accurately manage data streams.

Fourth Embodiment

Figure 5:
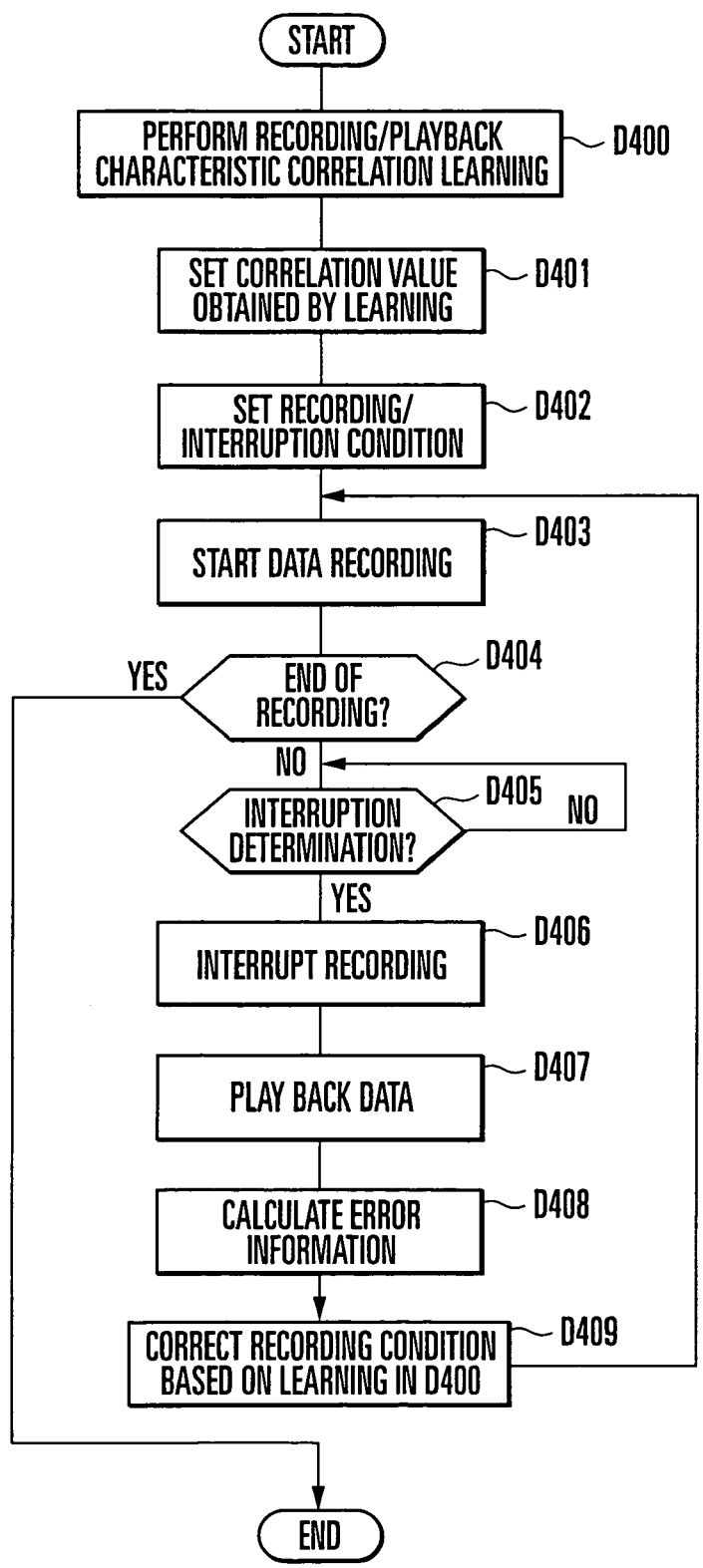
FIG. 5 is a flowchart showing an example of the flow of processing in an information recording/playback method according to the fourth embodiment of the present invention.

The fourth embodiment of the present invention will be described next. As shown in FIG. 5, an information recording medium recording method according to the fourth embodiment of the present invention is configured to perform the following processes: recording/playback characteristic correlation learning D400 in which a correlation relationship is learnt before the start of data recording, correlation value setting D401 based on learning, recording condition and interruption condition setting D402, data recording starting D403, recording end determination D404, interruption condition determination D405, recording interruption D406, data playback D407, error information calculation D408, and recording condition correction D409 based on learning in D400.

In recording/playback characteristic correlation learning D400, recording/playback characteristic correlation learning is performed, in which playback operation is performed with respect to signals recorded in predetermined units (e.g., ECC blocks) under different recording conditions, and a relationship with error information indicating the error between an ideal signal (estimated reference waveform signal) with respect to each recording condition and the played-back recording signal playback waveform signal is obtained.

With this operation, a correspondence indicating to which recording condition the amount indicated by error information corresponds and how much the recording state/performance changes as a recording condition is changed is directly calculated on a disk on which recording is executed. Specific recording conditions include the power of an LD at the time of execution of recording, the waveform of light emitted from the LD (recording strategy), the tilt between a PHU and an optical disk serving as an information recording medium at constant power, and a servo parameter associated with the waveform of a light beam focused by an objective lens.

In correlation value setting D401 by learning, the correlation value obtained in recording/playback characteristic correlation learning D400 is set.

In recording condition and interruption condition setting D402, a power, a recording strategy, and a recording state value are set as recording conditions, and a condition for interrupting data recording is set as an interruption condition. At this time, as the power and recording strategy, pieces of information which the apparatus or recording medium has in advance may be used. However, a recording condition of those obtained in recording/playback characteristic correlation learning D400 which exhibits the best performance may be set.

As in the first to third embodiments, conditions for interruption include a case wherein the apparatus state or environmental state changes, a case wherein the state of an optical disk as an information recording medium changes from that at the start of recording, a case wherein a predetermined amount of disk area is used, and the like. More specifically, the case wherein the apparatus state changes corresponds to a case wherein the number of revolutions changes, and the case wherein the environmental state changes corresponds to a case wherein the temperature changes. Likewise, the case wherein a predetermined amount of disk area is used corresponds to a case wherein recorded data reaches a predetermined amount or a predetermined period of time has elapsed, and the case wherein the state of an optical disk changes from that at the start of recording corresponds to a case wherein a servo parameter including a tilt, exceeds an allowable value.

In data recording starting D403, run-length-limited recorded/modulated data are started to be recorded for each ECC block consisting of, for example, 64 KB. As recording conditions at this time, parameters which the apparatus has in advance, parameters embedded in a disk, or the values obtained in recording/playback characteristic correlation learning D400 are used.

In recording end determination D404, it is determined whether or not scheduled data recording is ended. If the scheduled data recording is ended, the recording is terminated. If the recording is not ended, the flow advances to the next step.

In interruption determination D405, it is determined whether or not a predetermined interruption condition is met. If the condition is not met, recording is continued. If the condition is met, recording is interrupted (D406).

In data playback D407, the data which has already been recorded in an area is played back for, for example, each ECC block. An area from which data is played back is an area in which the data has already been recorded, and there is no limitation as to which area is to be used. However, areas from which data is to be played back preferably include an area located immediately before an area in which playback has been interrupted.

In error information calculation D408, the error information of a recording signal is calculated by using the error between the played-back signal and an ideal signal (an estimated reference waveform signal) derived from the partial response characteristic of a data sequence (an estimated data sequence) estimated from the waveform signal (the recording signal playback waveform signal) of the played-back recording signal. Error information includes, for example, an asymmetry value and SNR.

In recording condition correction D409 based on learning in D400, a recording condition is corrected on the basis of the error information obtained in D406. At this time, as the recording condition, at least one of the power, recording waveform shape, and servo parameter is changed. This changing is generally executed by a controller (CPU). Subsequently, data recording is started (D403) or resumed.

Figure 6:
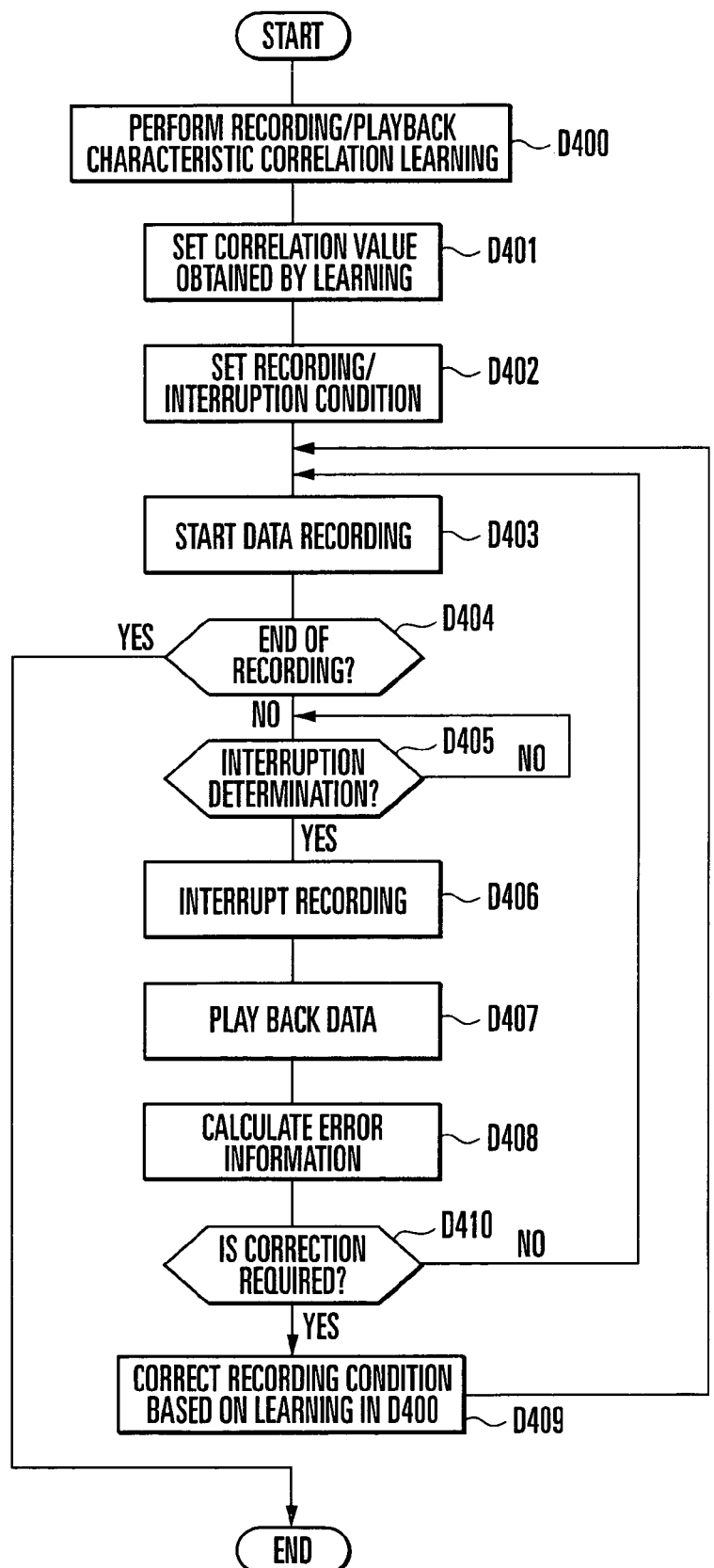
FIG. 6 is a flowchart showing an example of the flow of processing in an information recording/playback method according to the fourth embodiment of the present invention.

In this arrangement, correction necessity determination D410 may be provided between error information calculation D408 and recording condition correction D409 based on learning in D400. FIG. 6 shows an arrangement provided with correction necessity determination D410. In correction necessity determination D410, the necessity of correction of a recording condition is determined by using the error information obtained in D408. For example, this determination is made by using error information obtained by combining a power and an asymmetry value or a PRSNR, as shown in FIG. 16. The arrangement may include a step in which it is determined whether or not correction is necessary, so that if it is determined that correction is necessary, the flow advances recording condition correction D409, and if it is determined that correction is not necessary, the flow advances to data recording starting D403.

As described, in this specific example, since the correlation between a recording condition and error information is learnt before data recording, a recording condition can be calculated more accurately. This makes it possible to keep a recording state more stably.

Fifth Embodiment

Figure 7:
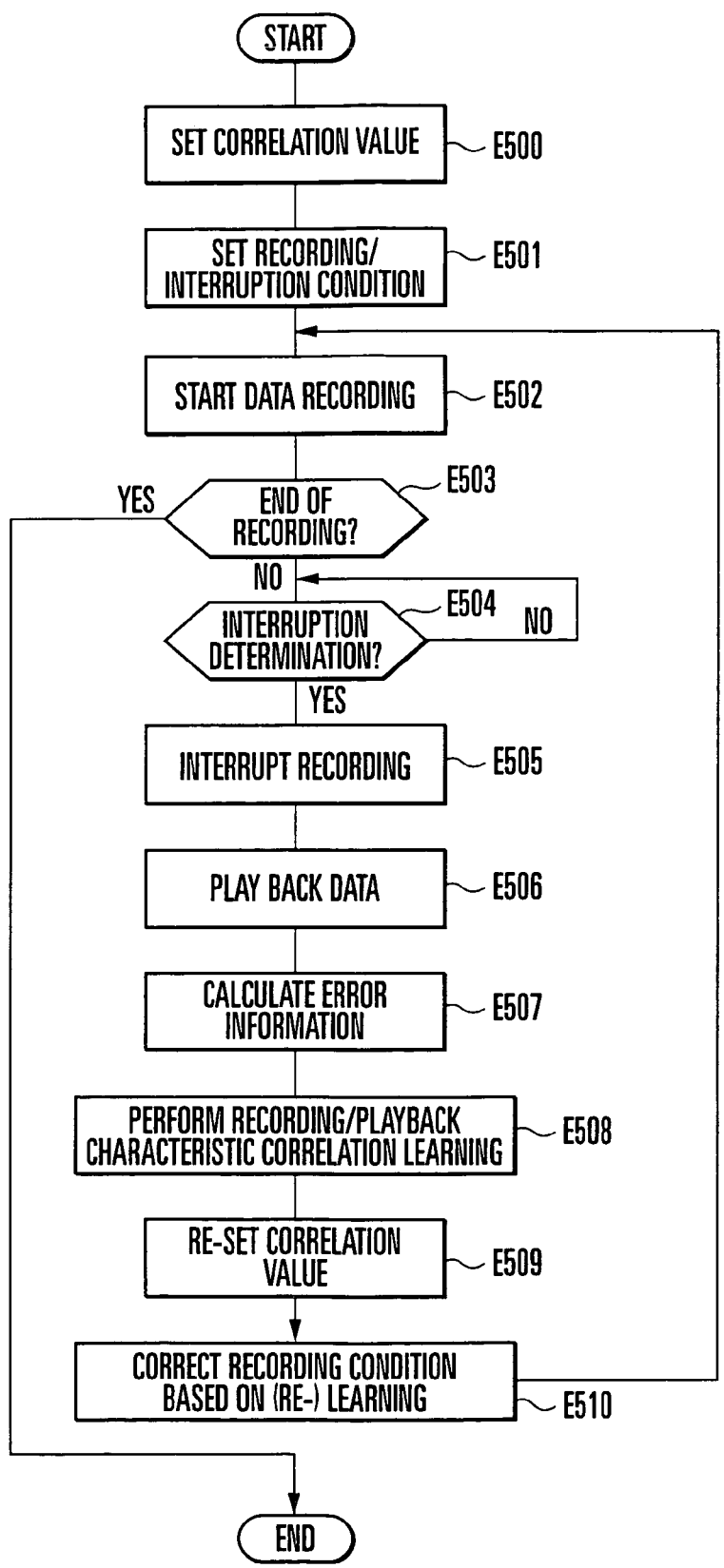
FIG. 7 is a flowchart showing an example of the flow of processing in an information recording/playback method according to the fifth embodiment of the present invention.

The fifth embodiment of the present invention will be described next. As shown in FIG. 7, an information recording medium recording method according to the fifth embodiment is configured to perform the following processes: correlation value setting E500, recording condition and interruption condition setting E501, data recording starting E502, recording end determination E503, interruption condition determination E504, recording interruption E505, data playback E506, error information calculation E507, recording/playback characteristic correlation learning E508, correlation value re-setting E509, and recording condition correction E510 based on learning. Although recording/playback characteristic correlation learning (D500) is not executed before data recording in this embodiment, this process is preferably executed before data recording.

The processing up to error information calculation E507 is the same as that in the first to third embodiments.

In recording/playback characteristic correlation learning E508, recording/playback characteristic correlation learning is performed, in which playback operation is performed with respect to signals recorded in predetermined units (e.g., ECC blocks) under different recording conditions, and a relationship with error information indicating the error between an ideal signal with respect to each recording condition and the played-back recording signal playback waveform signal is obtained. With this operation, a correspondence indicating to which recording condition the amount indicated by error information corresponds and how much the recording state/performance changes as a recording condition is changed is directly calculated on a disk on which recording is executed.

In correlation value re-resetting 509, a correlation value is re-set on the basis of the relationship between a recording condition and error information in recording/playback characteristic correlation learning E508.

In recording condition correction E510 based on learning, a recording condition is corrected on the basis of the recording condition value obtained in recording/playback characteristic correlation learning E508. At this time, as the recording condition, at least one of the power, the recording waveform shape, and the servo parameter is changed. This changing is generally executed by a controller (CPU). Subsequently, the flow returns to data recording starting E502 to resume recording.

Figure 8:
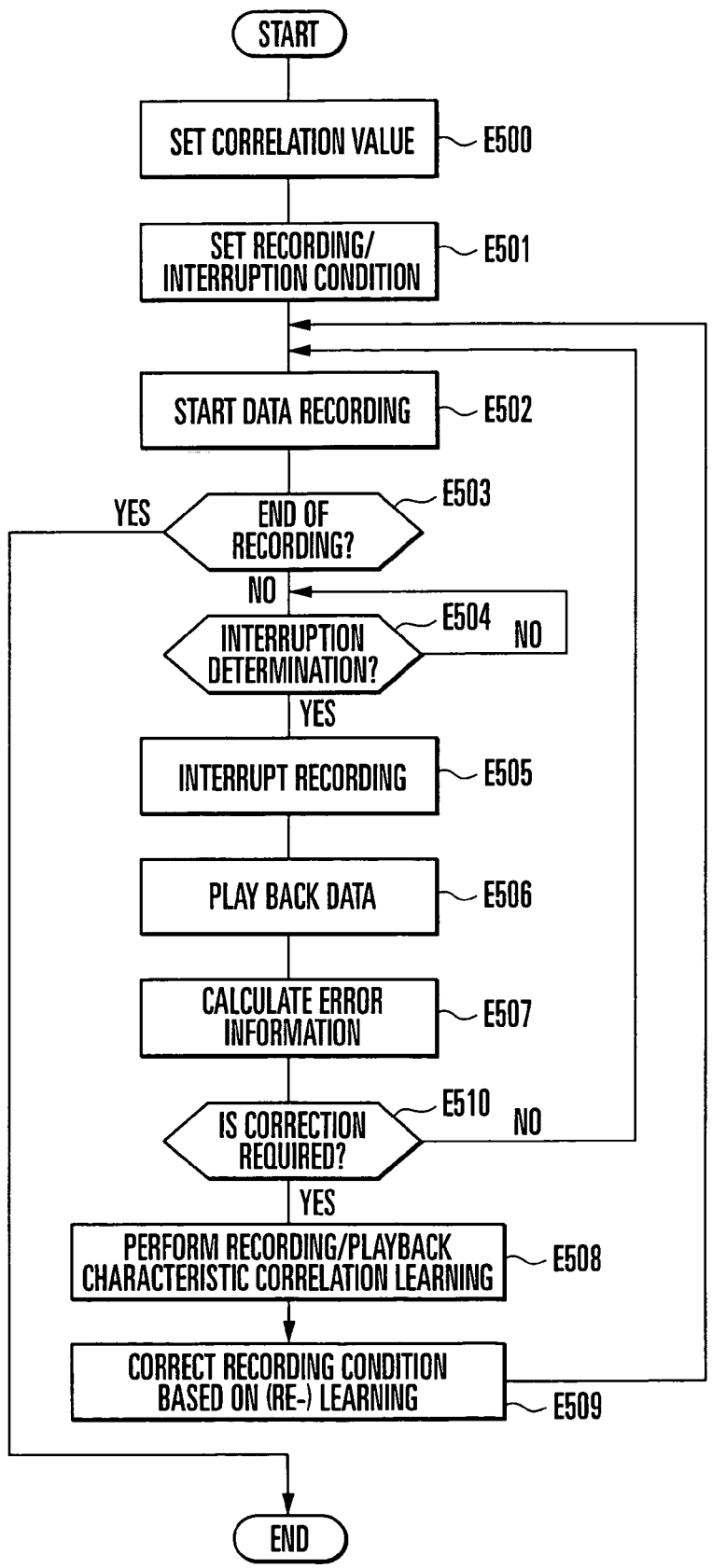
FIG. 8 is a flowchart showing an example of the flow of processing in an information recording/playback method according to the fifth embodiment of the present invention.

In this arrangement, correction necessity determination E510 may be provided between error information calculation E507 and recording/playback characteristic correlation learning E508. FIG. 8 shows an arrangement provided with correction necessity determination E510. If it is determined in correction necessity determination E510 that correction is necessary, in recording condition correction E508 based on (re-)learning, recording/playback characteristic correlation learning is performed, in which playback operation is performed with respect to signals recorded in predetermined units (e.g., ECC blocks) under different recording conditions, and a relationship with error information indicating the error between an ideal signal with respect to each recording condition and the played-back recording signal playback waveform signal is obtained. If this process is not necessary, the flow returns to data recording starting E502.

As described above, in this specific example, since recording/playback characteristic correlation learning is performed between recording interruption and recording resumption (recording condition correction), even if the state before the start of recording differs from that upon execution of recording/playback characteristic correlation learning, stable recording with a higher affinity can be performed.

Sixth Embodiment

Figure 9:
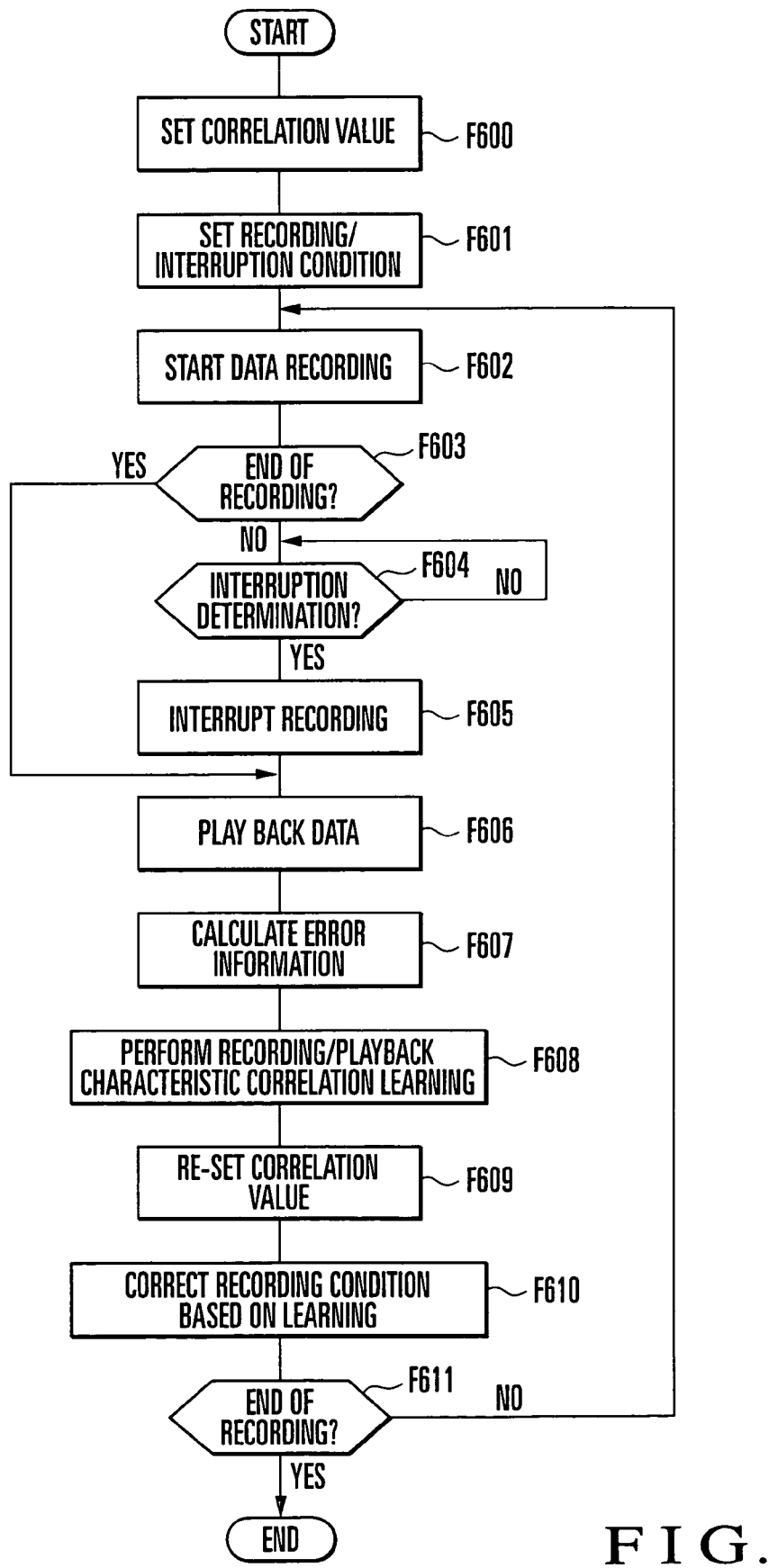
FIG. 9 is a flowchart showing an example of the flow of processing in an information recording/playback method according to the sixth embodiment of the present invention.

The sixth embodiment of the present invention will be described next. As shown in FIG. 9, an information recording medium recording method according to the sixth embodiment is configured to perform the following processes: correlation value setting F600, recording condition and interruption condition setting F601, data recording starting F602, recording end determination F603, interruption condition determination F604, recording interruption F605, data playback F606, error information calculation F607, recording/playback characteristic correlation learning F608, correlation value re-setting F609, and recording condition correction F610 based on learning. Although recording/playback characteristic correlation learning (D500) is not executed before data recording in this embodiment, this process is preferably executed before data recording.

The processing up to data recording starting F602 is the same as that in the fifth embodiment. In data recording end determination F603, it is determined whether or not scheduled data recording is ended. If the scheduled data recording is ended, the recording is terminated, and data playback F606 and subsequent processing (to be described later) are performed. If the recording is not ended, the flow advances to next interruption determination F604.

In interruption determination F604, it is determined whether or not a predetermined interruption condition is met. If the condition is not met, recording is continued. If the condition is met, recording is interrupted (F605).

In data playback F606, the data which has already been recorded in an area is played back for, for example, each ECC block. An area from which data is played back is an area in which the data has already been recorded, and there is no limitation as to which area is to be used. However, areas from which data is to be played back preferably include an area located immediately before an area in which playback has been interrupted.

In error information calculation F607, the error information of the recording signal is calculated by using the error between the played-back signal and an ideal signal (an estimated reference waveform signal) derived from the partial response characteristic of a data string (an estimated data string) estimated from the waveform signal (the recording signal playback waveform signal) of the played-back recording signal. Error information includes, for example, an asymmetry value and SNR.

In recording/playback characteristic correlation learning F608, recording/playback characteristic correlation learning is performed, in which playback operation is performed with respect to signals recorded in predetermined units (e.g., ECC blocks) under different recording conditions, and a relationship with error information indicating the error between an ideal signal with respect to each recording condition and the played-back recording signal playback signal is obtained.

In correlation value re-resetting F609, the correlation value between error information and the recording condition obtained in recording/playback characteristic correlation learning F608 is re-set. At this time, the correlation value in correlation value setting F600 is also set.

In recording condition correction E610 based on learning, a recording condition is corrected on the basis of the error information set in F607. Thereafter, in recording end determination F611, if it is determined in F603 that the recording is ended, the processing is terminated. If it is determined that the recording is not ended, the flow returns to data recording starting F602, and data recording is resumed.

As described above, in this specific example, recording/playback characteristic correlation learning is performed after recording interruption, and the correlation value between a recording condition and error information is always updated. This makes it possible to perform recording with higher stability.

The following is the results obtained by executing the recording methods described in the respective embodiments. Note that optical disks include a medium (to be referred to as an L-H medium hereinafter) which increases in reflectance as information is recorded and a medium (to be referred to as an H-L medium hereinafter) which decreases in reflectance when information is recorded. In the following specific examples, media (L-H media) which increase in reflectance when information is recorded were used, except for Disk E (H-L medium).

SPECIFIC EXAMPLE 1

Figure 10:
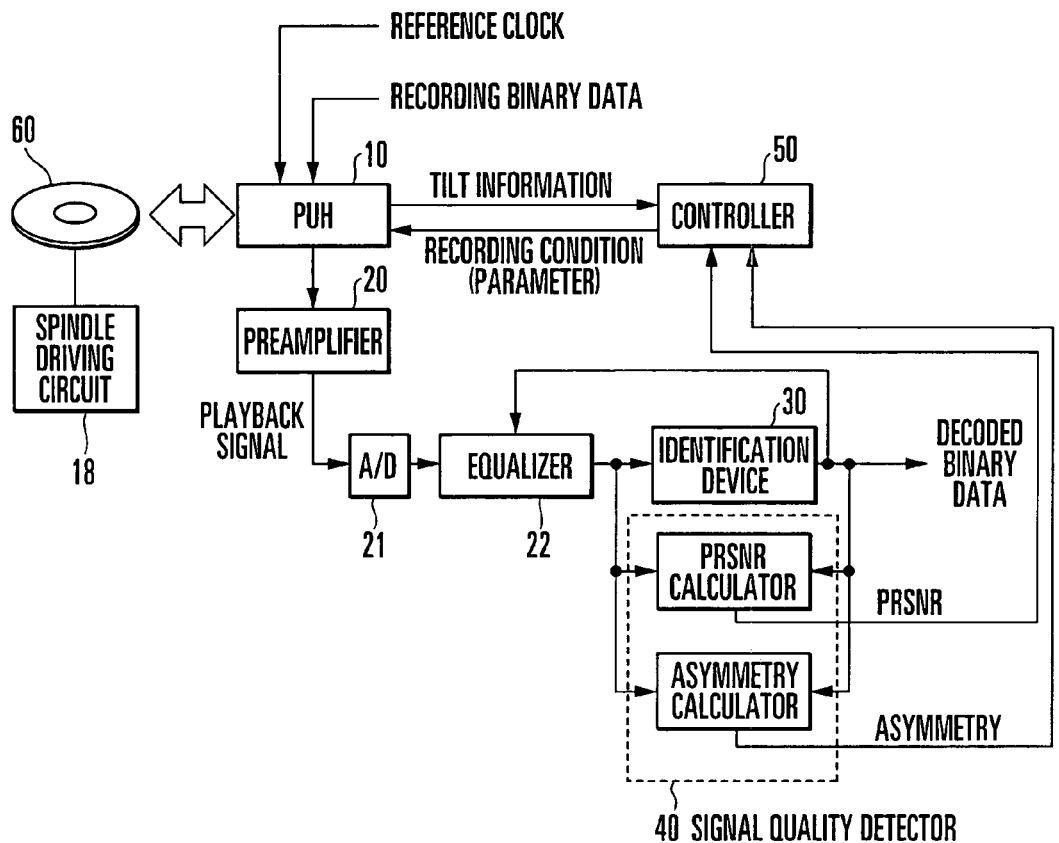
FIG. 10 is a block diagram showing an example of an information recording/playback apparatus according to the present invention.
Figure 11:
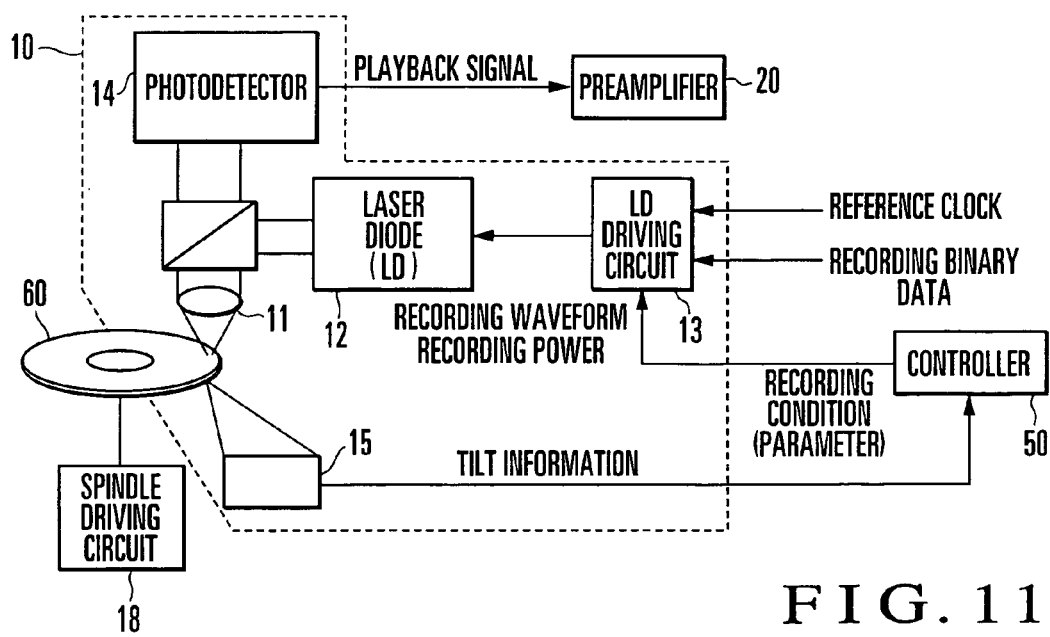
FIG. 11 is a block diagram showing an example of the arrangement of a PUH in the information recording/playback apparatus according to the first specific example of the present invention.

FIG. 10 shows the arrangement of an information recording/playback apparatus which realizes the recording method described in each embodiment described above. The information recording apparatus (optical disk apparatus) includes at least a PUH (PickUpHead) 10, preamplifier 20, A/D converter 21, equalizer 22, identification device 30, signal quality detector 40, and controller 50. FIG. 11 shows the details of the arrangement of the PUH 10 in FIG. 10. This arrangement includes at least an objective lens 11, laser diode (LD) 12, LD driving circuit 13, photodetector 14, and tilt information detector 15.

Referring to FIG. 10, the PUH 10 is accurately positioned at a desired position of an optical disk 60 by a servo technique. The PUH 10 itself or the objective lens 11 is controlled by the servo technique. Control parameters are respectively prepared for positioning in the radial direction of the optical disk 60 (finely or coarsely), positioning in the vertical direction of the optical disk 60, and the detection/correction of the tilt between the optical disk 60 and the PUH 10.

Referring to FIG. 11, the LD driving circuit 13 controls the output of the LD 12. The objective lens 11 applies the laser beam output from the LD 12 onto the recording layer of the optical disk 60 to read/write information from/to the optical disk 60. Reflected light of the laser beam applied by the objective lens 11 strikes the objective lens 11, and is input to the photodetector 14. A spindle driving circuit 18 rotates the optical disk 60. The photodetector 14 plays back data recorded on the optical disk 60 on the basis of the reflected light from the optical disk 60. The tilt information detector 15 detects the tilt between the optical disk 60 and the PUH 10.

In recording, the LD driving circuit 13 uses recording binary data. Note that a converter with a minimum run length of one converts this recording binary data into a code bit sequence in which at least two 0s or is continuously appear. The LD driving circuit 13 converts the recording binary data into a recording waveform under the recording condition (parameter) output from a controller 17. The recording waveform of an electrical signal is converted into an optical signal by the optical head, and the resultant light is applied to the optical disk. On the optical disk, a mark is formed in accordance with the application of the laser beam.

As the optical disk 60, an optical disk with a guide groove is used. When recording is started, the controller 50 repeatedly determines whether or not a predetermined interruption condition is met. If the interruption condition is met, the controller interrupts the recording and executes the operation of playing back an area on which information has already been recorded, which includes the area on which recording is interrupted.

The preamplifier 20 amplifies a weak signal from the photodetector 14. The amplified signal is converted into a digital signal by being sampled at a predetermined frequency by using the A/D converter 21. The equalizer 22 including a PLL converts the digital playback signal into a signal synchronized with a channel clock, and is simultaneously converted into an equalized playback signal close to the PR(1, 2, 2, 2, 1) characteristic. The identification device (typically a Viterbi decoder) 30 selects a path exhibiting the minimum Euclidean distance from the equalized playback signal, and outputs a code bit sequence corresponding to the selected path as decoded binary data. The signal quality detector 40 measures an asymmetry and PRSNR (Partial Response Signal to Noise Ratio) from this data string as an estimated data string. In this case, asymmetry detection is performed by using an output from the equalizer. However, the same effect can be obtained by using an output from the A/D converter 21. The controller 50 sets a recording condition (parameter) in the PUH 10 on the basis of the detection result from the signal quality detector 40. The controller 50 corrects the recording condition by using a set correction value, and resumes recording by using the corrected recording condition. In resuming recording, the controller 50 determines the presence/absence of data to be recorded. If there is no data to be recorded, the recording is terminated.

Recording was executed by using the information recording/playback apparatus having the above arrangement in accordance with the sequence shown in FIG. 1 at a shortest bit length of 0.13 μm/bit in (1, 7) RLL with respect to a phase-change disk having a substrate thickness of 0.6 mm with an NA of 0.65 (of the objective lens of an optical head) and an LD wavelength λ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk A. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. This operation will be described below with reference to FIG. 19. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Figure 19:
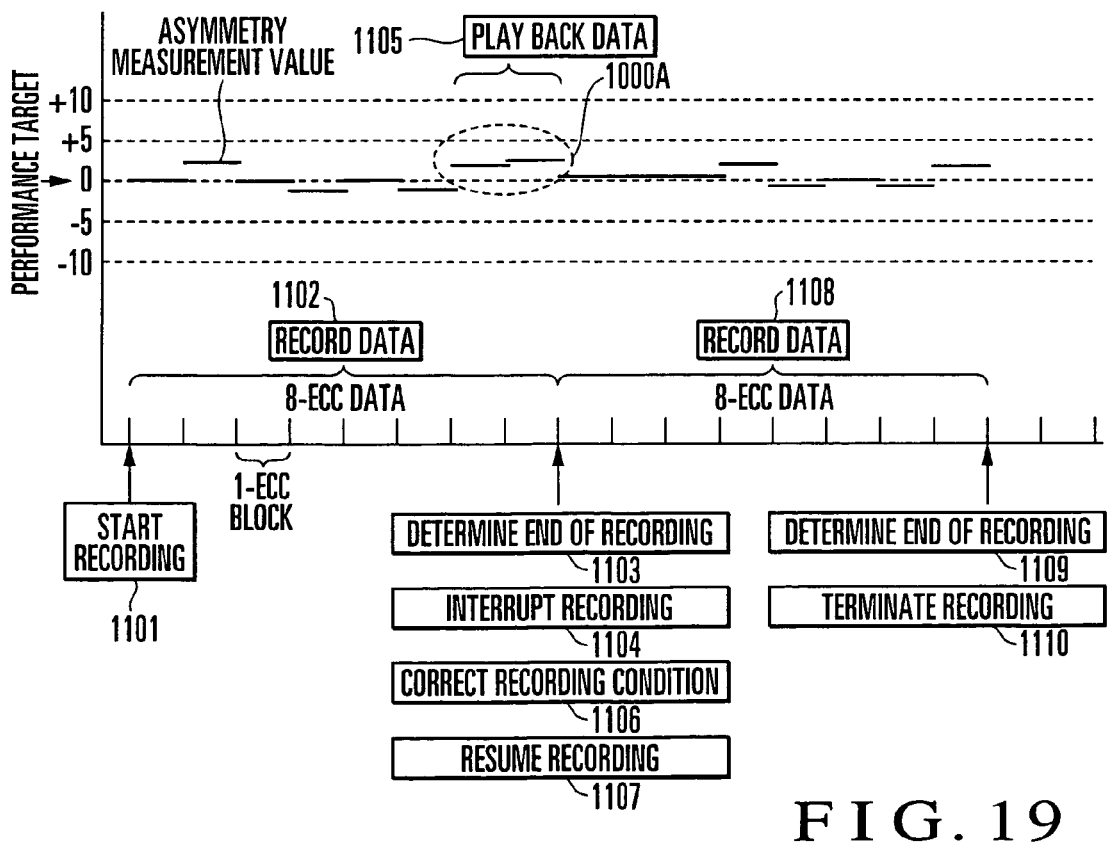
FIG. 19 is a graph showing the operation (first specific example) of the recording/playback apparatus in FIG. 10.

Recording is started (1101 in FIG. 19) to record data corresponding to eight ECCs (1102 in FIG. 19). Recording end determination is performed (1103 in FIG. 19). Since data scheduled to be recorded is left, the recording is continued without being ended. The controller 50 also executes interruption determination on an ECC basis. When recording corresponding to eight ECCs is complete, the controller 50 determines whether or not to interrupt the recording (1104 in FIG. 19). Data corresponding to two ECCs, including a block immediately before the recording interruption, are played back (1105 in FIG. 19). The signal quality detector 40 calculates an asymmetry from the played-back data (the portion enclosed with a dotted line circle 1000A in FIG. 19). For the sake of descriptive convenience, asymmetry measurement values other than those in a portion in which data corresponding to two ECCs immediately before the recording interruption are also presented. The controller 50 derives a correction value from the deviation amount between the target value and the measurement value, and sets the corrected recording condition as a recording condition in the resumption of recording in the PUH 10 (1106 in FIG. 19). A deviation amount and correction amount were derived from Table 2 which the apparatus had in advance, and as a value which was not present in the table, a value corrected by approximation calculated was used. When recording is resumed (1107 in FIG. 19), and data corresponding to eight ECCs are recorded (1108 in FIG. 19), recording end determination is performed (1109 in FIG. 19). Since no data scheduled to be recorded is left, the recording is terminated (1110 in FIG. 19). In this manner, stable recording was able to be executed.

TABLE 2

| Disk A | | | | | |
| --- | --- | --- | --- | --- | --- |
| Asymmetry (%) | −10 | −5 | 0 | +5 | +10 |
| Power (mW) | 5.6 | 5.3 | 5.0 | 4.7 | 4.4 |

SPECIFIC EXAMPLE 2

Recording was executed by using the information recording/playback apparatus in FIG. 10 in accordance with the sequence shown in FIG. 3 at a shortest bit length of 0.13 µm/bit in (1, 7) RLL with respect to a phase-change disk having a substrate thickness of 0.6 mm with an NA of 0.65 (of the objective lens of an optical head) and an LD wavelength λ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk B. A recording condition may be set at this time or when a recording start command is received from the host system.

Upon receiving a recording start command from the host system, the controller 50 starts recording. Assume that data to be recorded are data corresponding to 18 ECCs, and an interruption condition is that data corresponding to eight ECCs are recorded. This operation will be described below with reference to FIG. 20. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%. An asymmetry of ±5% was a determination threshold for addition or change of an interruption condition. This threshold was determined from the asymmetry and PRSNR measurements in Table 3.

Figure 20:
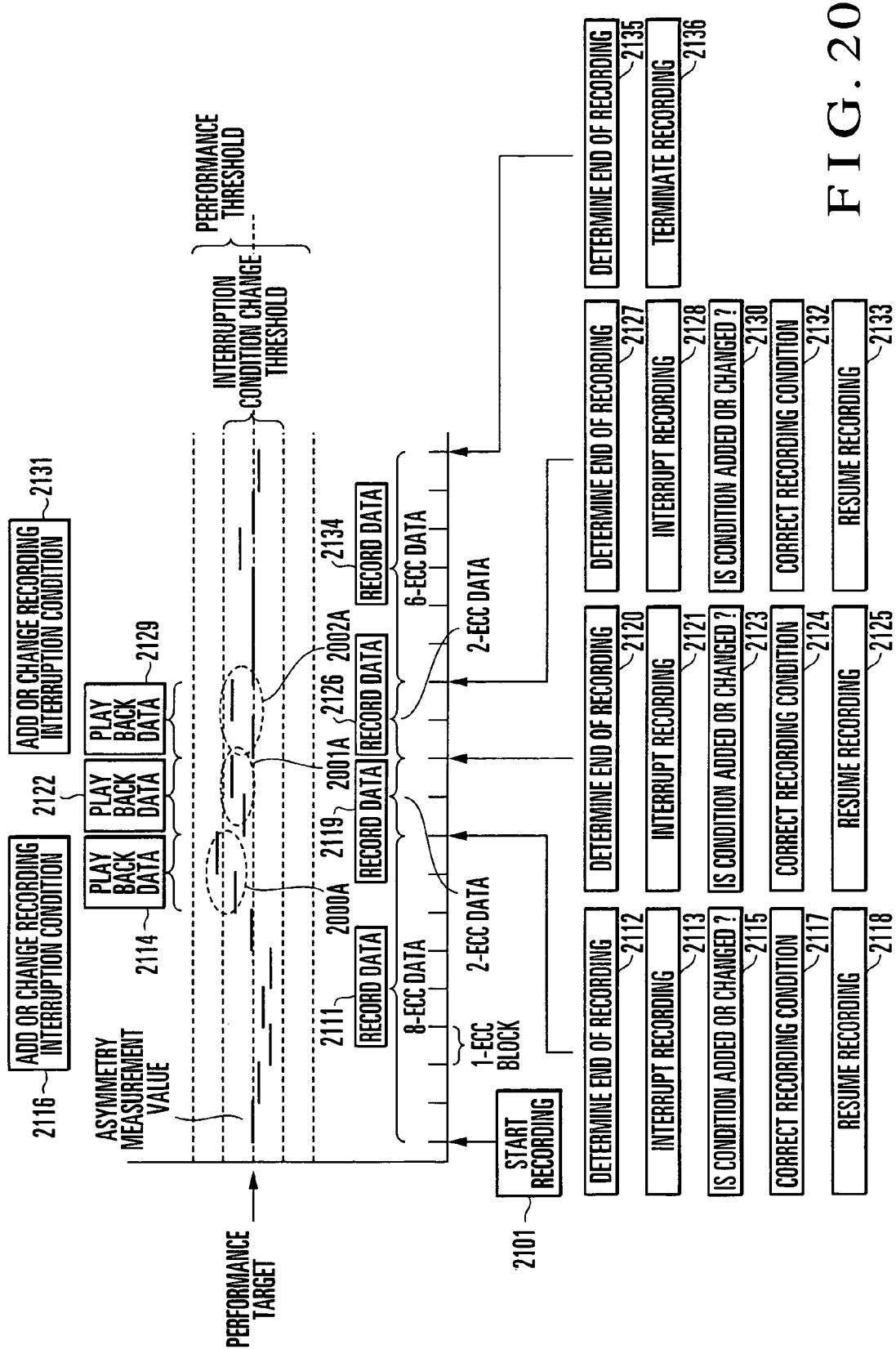
FIG. 20 is a graph showing the operation (second specific example) of the recording/playback apparatus in FIG. 10.

Recording is started (2101 in FIG. 20) to record data corresponding to eight ECCs (2111 in FIG. 20). The controller 50 executes interruption determination, for example, on an ECC basis. When the controller 50 determines by recording end determination (2112 in FIG. 20) that there is data scheduled to be recorded, and recording corresponding to eight ECCs is complete, the controller 50 determines whether or not to interrupt the recording (2113 in FIG. 20).

Data corresponding to two ECCs, including a block immediately before the recording interruption, are played back (2114 in FIG. 20). The signal quality detector 40 calculates an asymmetry from the played-back data (the portion enclosed with a dotted line circle 2000A in FIG. 20). Since it is determined by condition addition/change (2115 in FIG. 20) that the asymmetry calculated from error information exceeds an addition/change threshold for an interruption condition, the condition addition interruption condition is changed (2116 in FIG. 20). For the sake of descriptive convenience, asymmetry measurement values other than those in a portion in which data corresponding to two ECCs immediately before the recording interruption are also presented.

The controller 50 derives a correction amount from the deviation amount between the target value and the measurement value and corrects the recording condition (2117 in FIG. 20). Recording is resumed under the corrected recording condition (2118 in FIG. 20). The controller 50 then records data on an ECC basis (2119 in FIG. 20) and determines a recording interruption condition on an ECC basis.

The controller 50 performs recording end determination when data corresponding to two ECCs are recorded (2120 in FIG. 20). Since data scheduled to be recorded is left, recording interruption processing is executed. In the same manner as described above, the controller 50 performs playback (2001A in FIG. 20: the portion enclosed with the dotted line circle corresponds to the playback result), interruption condition addition/change determination (2123 in FIG. 20), and recording condition correction (2124 in FIG. 20), and resumes recording (2125 in FIG. 20). The controller 50 then records data on an ECC basis (2126 in FIG. 20) and executes recording end determination (2127 in FIG. 20).

Since data scheduled to be recorded was left, the controller 50 executed recording interruption (2128 in FIG. 20), playback of recorded data (2129 in FIG. 20) (2002A in FIG. 20: the portion enclosed with the dotted line circle corresponds to the playback result), condition addition/change determination (2130 in FIG. 20), interruption condition addition/change (2131 in FIG. 20), recording condition correction (2132 in FIG. 20), and recording resumption (2133 in FIG. 20). Since the condition addition/change determination (2130 in FIG. 20) indicated that the deviation amounts fell within an asymmetry of 5%, which was the interruption condition change threshold, two times consecutively, the controller 50 changed the recording interruption condition from data corresponding to two ECCs. In recording end determination (2135 in FIG. 20), the number of data recorded had reached the number of data scheduled to be recorded when data corresponding to six ECCs were recorded (2134 in FIG. 20), the controller 50 ended recording (2136 in FIG. 20).

In this manner, stable recording was able to be executed. Note that a determination threshold for addition or change of an interruption condition is determined from an asymmetry and PRSNR in Table 3. However, a PRSNR may be measured in advance simultaneously with an asymmetry, and determination of interruption condition addition or condition change may be executed by using the measured PRSNR value together. This measurement data corresponds better to the current state of the apparatus than the table data which the apparatus has in advance. Therefore, more proper correction can be executed.

TABLE 3

Disk B

| Asymmetry (%) | −10 | −5 | 0 | +5 | +10 |
|---|---|---|---|---|---|
| PRSNR | 13.0 | 16.8 | 20.0 | 16.0 | 13.6 |
| Power (mW) | 5.8 | 5.5 | 5.2 | 4.9 | 4.6 |

SPECIFIC EXAMPLE 3

Figure 21:
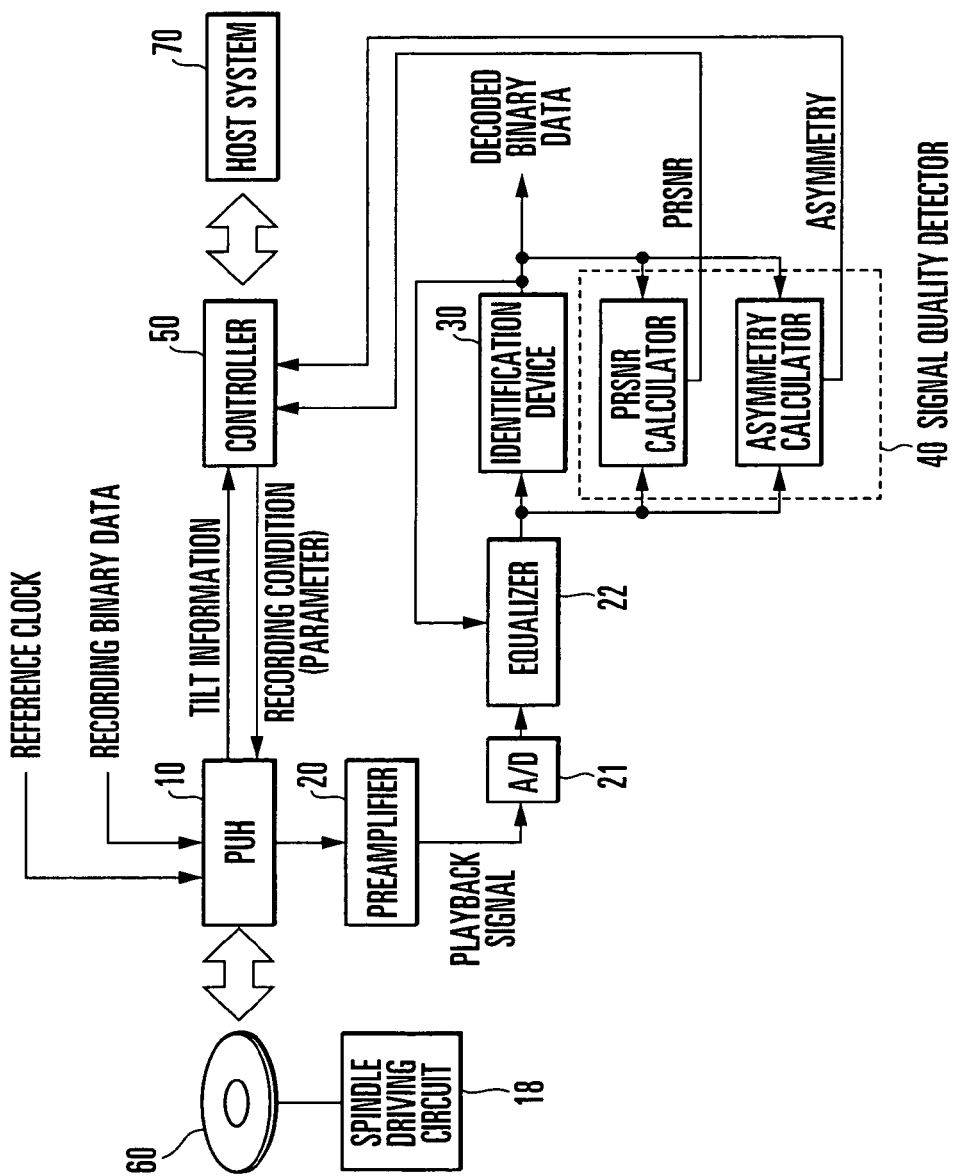
FIG. 21 is a block diagram showing another example of the information recording/playback apparatus of the present invention.

FIG. 21 shows another arrangement of the information recording/playback apparatus according to the present invention. The information recording apparatus (optical disk apparatus) includes at least the PUH (PickUpHead) 10, the preamplifier 20, the A/D converter 21, the equalizer 22, the identification device 30, the signal quality detector 40, the controller 50, and a host system 70. The components other than the host system 70 have already been described, and hence the host system 70 will be described. The host system 70 exchanges information with the controller 50. More specifically, the host system 70 transmits a record command for information and information data to be recorded to the controller 50. The controller 50 indicates, to the host system, status information representing the state of the information record/playback apparatus.

Recording was executed by using the information recording/playback apparatus in FIG. 21 in accordance with the sequence shown in FIG. 4 at a shortest bit length of 0.13 µm/bit in (1, 7) RLL with respect to a phase-change disk having a substrate thickness of 0.6 mm with an NA of 0.65 (of the objective lens of an optical head) and an LD wavelength λ of 405 nm. Data were recorded/played back on an ECC basis When the optical disk 60 is loaded into the optical disk apparatus, the controller 50 discriminates the type of optical disk 50, and then adjusts servo parameters. Thereafter, the controller 50 reads various kinds of apparatus control parameter information written on the disk. In this specific example, the finally determined disk was Disk C. A recording condition may be set at this time or when a recording start command is received from the host system.

Figure 22:
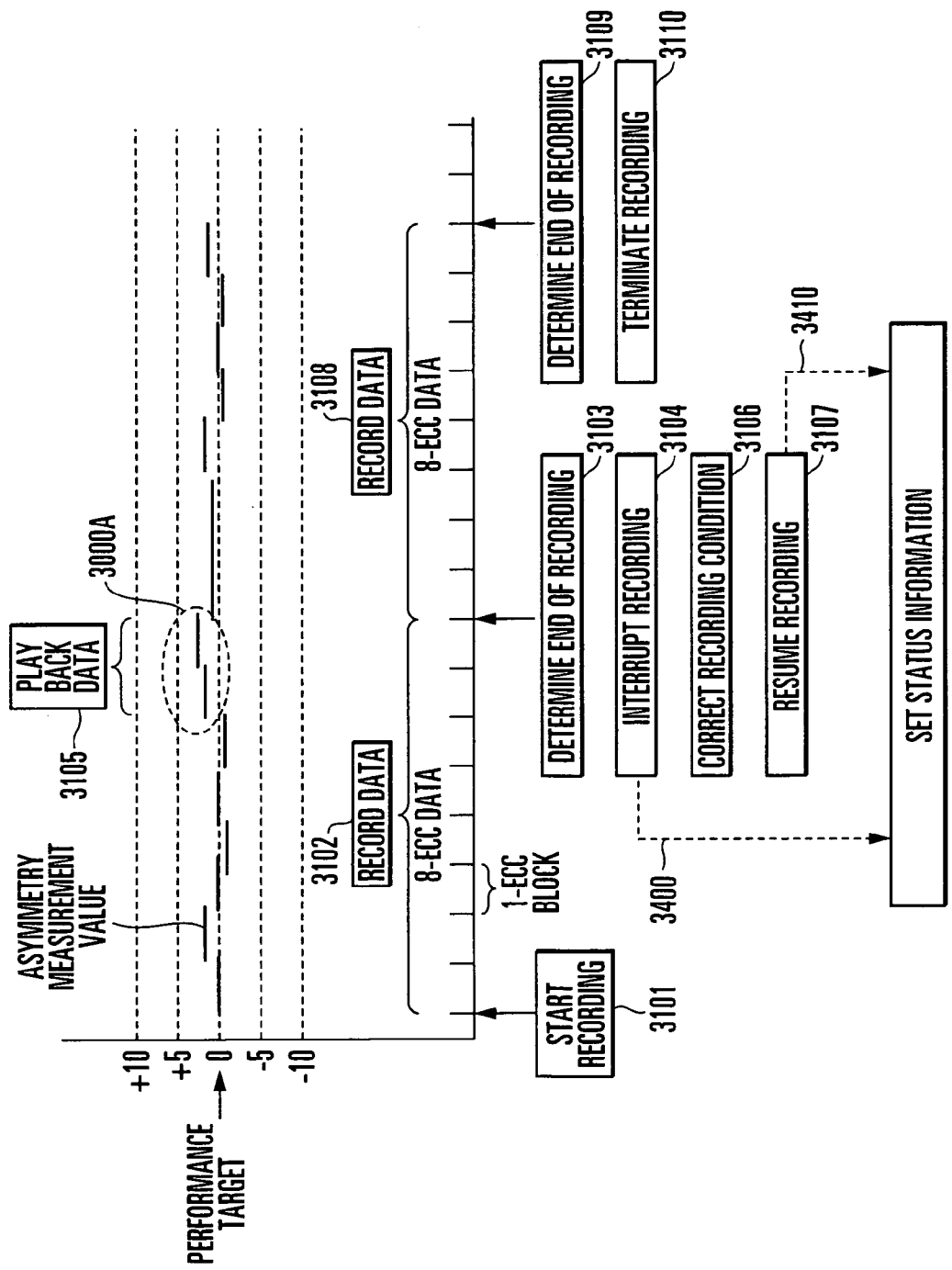
FIG. 22 is a graph showing the operation (third specific example) of the recording/playback apparatus in FIG. 21.

Upon receiving a recording start command from the host system, the controller 50 starts recording. Assume, for the sake of descriptive convenience, that data corresponding to 16 ECCs are held in advance as data to be recorded, and an interruption condition is that data corresponding to eight ECCs are recorded. This operation will be described below with reference to FIG. 22. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Recording is started (3101 in FIG. 22) to record data corresponding to eight ECCs. The controller 50 executes interruption determination, for example, on an ECC basis. When the controller 50 determines by recording end determination (3103 in FIG. 22) that there is data scheduled to be recorded, and recording corresponding to eight ECCs is complete, the controller 50 performs recording interruption determination (3104 in FIG. 22). The controller 50 then indicates status information representing interruption to the host system 70 (3400 in FIG. 22). The host system manages data so as not to cause data discontinuity by using a buffer (not shown). subsequently, data corresponding to two ECCs, including a block immediately before the recording interruption, are played back (3105 in FIG. 22). The signal quality detector 40 calculates an asymmetry from the played-back data (the portion enclosed with a dotted line circle 3000A in FIG. 22). For the sake of descriptive convenience, asymmetry measurement values other than those in a portion in which data corresponding to two ECCs immediately before the recording interruption are also presented. The controller 50 derives a correction value from the deviation amount between the target value and the measurement value, and sets the corrected recording condition as a recording condition in the resumption of recording in the PUH (3106 in FIG. 22). A deviation amount and correction amount were derived from Table 4 which the apparatus had in advance, and as a value which is not present in the table, a value corrected by approximation calculated was used. Since it is determined by recording end determination (3103 in FIG. 22) that data corresponding to eight ECCs which are scheduled to be recorded are left, recording is resumed (3107 in FIG. 22). At this time, a recording resumption status is set for the host system (3410 in FIG. 22). When data corresponding to eight ECCs are recorded (3108 in FIG. 22), recording end determination is performed (3109 in FIG. 22). Since no data scheduled to be recorded is left, the recording is terminated (3110 in FIG. 22). In this manner, stable recording was able to be executed.

SPECIFIC EXAMPLE 4

Recording was executed by using the information recording/playback apparatus in FIG. 21 in accordance with the sequence shown in FIG. 7 at a shortest bit length of 0.13 µm/bit in (1, 7) RLL with respect to a phase-change disk having a substrate thickness of 0.6 mm with an NA of 0.65 (of the objective lens of an optical head) and an LD wavelength λ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk C. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. This operation will be described below with reference to FIG. 23. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Recording is started (4110 in FIG. 23) to record data corresponding to eight ECCs. The controller 50 executes interruption determination, for example, on an ECC basis. When the controller 50 determines by recording end determination (4130 in FIG. 23) that there is data scheduled to be recorded, and recording corresponding to eight ECCs is complete, the controller 50 interrupts the recording. Data corresponding to two ECCs, including a block immediately before the recording interruption, are played back (4150 in FIG. 23). The signal quality detector calculates an asymmetry from the played-back data (the portion enclosed with a dotted line circle 4000A in FIG. 23). For the sake of descriptive convenience, asymmetry measurement values other than those in a portion in which data corresponding to two ECCs immediately before the recording interruption are also presented. The controller derives a correction value from the deviation amount between the target value and the measurement value, and sets the corrected recording condition as a recording condition in the resumption of recording in the PUH (4160 in FIG. 23). A deviation amount and correction amount were derived from Table 4 which the apparatus had in advance, and as a value which is not present in the table, a value corrected by approximation calculated was used. Since it is determined in recording end determination (4130 in FIG. 23) that data corresponding eight ECCs which are scheduled to be recorded are left, recording is resumed (4170 in FIG. 23). When the data corresponding to eight ECCs are recorded (4180 in FIG. 23), the controller 50 determines the end of the recording (4190 in FIG. 23).

Figure 23:
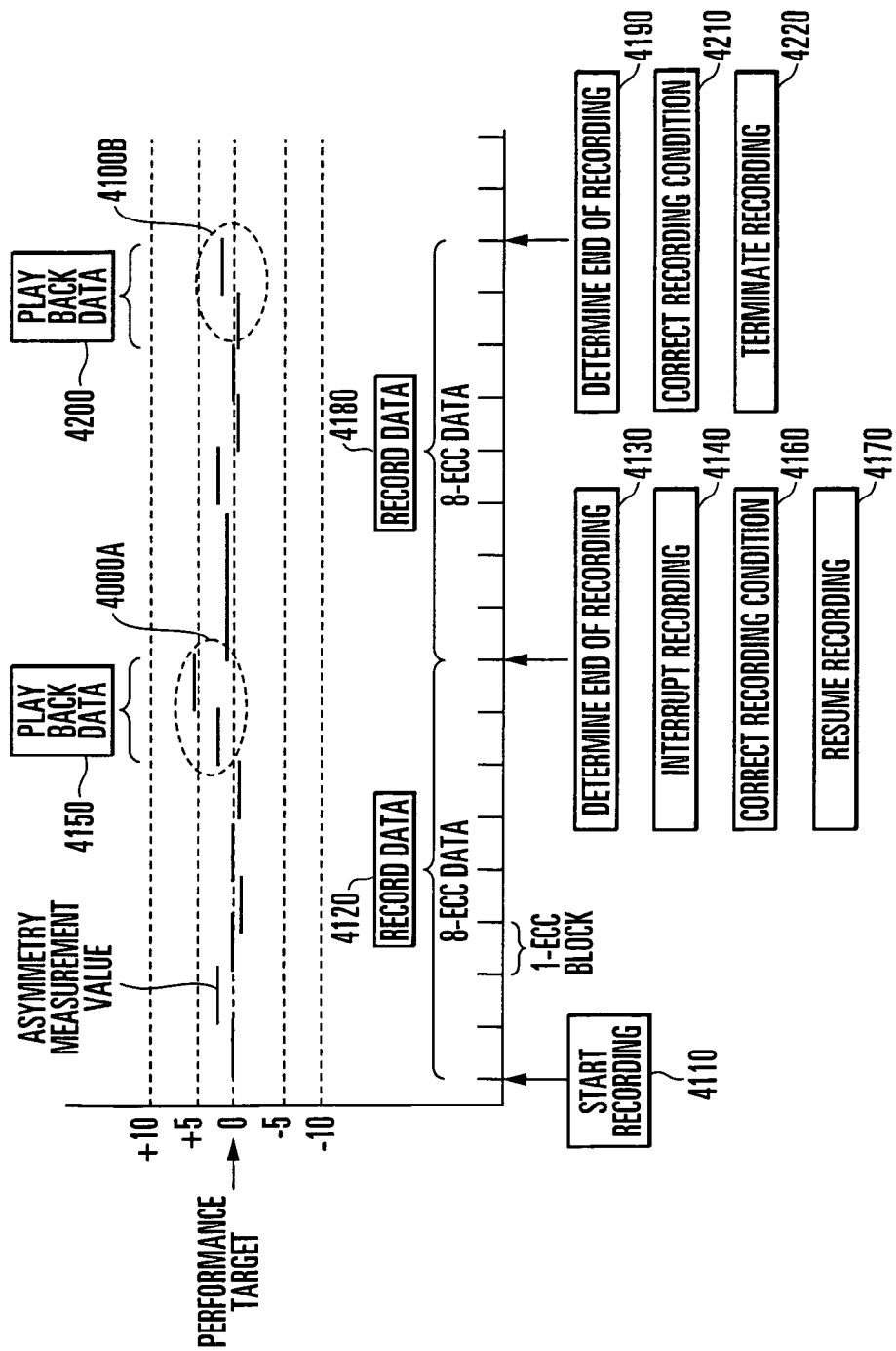
FIG. 23 is a graph showing the operation (fourth specific example) of the recording/playback apparatus in FIG. 21.

The controller 50 executes the operation of playing back data corresponding to two ECCs in the area immediately before the interruption (4200 in FIG. 23). The asymmetry of the played-back data is calculated by the signal quality detector (the portion enclosed with a dotted line circle 4100B in FIG. 23). As described above, for the sake of descriptive convenience, asymmetry measurement values other than those in a portion in which data corresponding to two ECCs immediately before the recording interruption are also presented. The controller derives a correction value from the deviation amount between the target value and the measurement value, and sets the corrected recording condition as a recording condition in the resumption of recording in the PUH (4210 in FIG. 23). Correction was made by using the same method as described above. Since no data scheduled to be recorded was left, the recording is terminated (4220 in FIG. 23). In this manner, stable recording was able to be executed.

TABLE 4

| Disk C | | | | | |
|---|---|---|---|---|---|
| Asymmetry (%) | −10 | −5 | 0 | +5 | +10 |
| Power (mW) | 5.6 | 5.3 | 5.0 | 4.7 | 4.4 |

SPECIFIC EXAMPLE 5

The present invention can also realize effective driving operation even with a tilt detection signal as a kind of servo parameter. This will be described below. The operation was executed by using the recording/playback apparatus described with reference to FIG. 10 in accordance with the sequence shown in FIG. 1. Data were recorded and played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk A. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. When a recording condition is corrected within data corresponding to two ECCs, recording condition correction is not executed at a time point corresponding to eight ECCs. When the tilt amount as one of the servo parameters exceeds a specified value, recording is interrupted on a shortest ECC basis. This operation will be described below with reference to FIG. 24. The abscissa represents the operation of the apparatus on the disk upon data segmentation in ECCs, the asymmetry measurement results obtained by the signal quality detector 40 which plays back a recorded signal and detects the quality of the played-back signal, and tilt measurement information. With regard to the asymmetry measurement results, the dotted lines extending along the abscissa are criteria of asymmetries of ±5% and ±10%. With regard to the tilt measurement results, the dotted lines extending along the abscissa indicate boundaries of radial tilts of ±0.25° between the optical disk 60 and the PUH 10.

Recording is started (5100 in FIG. 24) to record data corresponding to eight ECCs. The controller 50 executes interruption determination, for example, on an ECC basis. The tilt amount exceeds the specified amount (5250 in FIG. 24) during recording of data corresponding to eight ECCs, and the data corresponding to eight ECCs are recorded, recording interruption determination is performed (5400 in FIG. 24). Since interruption determination is made at data corresponding to two ECCs or less of the eight ECCs at which interruption has been scheduled initially, interruption in this specific example is equivalent to scheduled recording interruption at the eighth ECC. Data corresponding to two ECCs, including a block immediately before the recording interruption, are played back (5500 in FIG. 24). The signal quality detector calculates an asymmetry from the played-back data (the portion enclosed with a dotted line circle 5000A in FIG. 24). For the sake of descriptive convenience, asymmetry measurement values other than those in a portion in which data corresponding to two ECCs immediately before the recording interruption described in this example are also presented.

Figure 24:
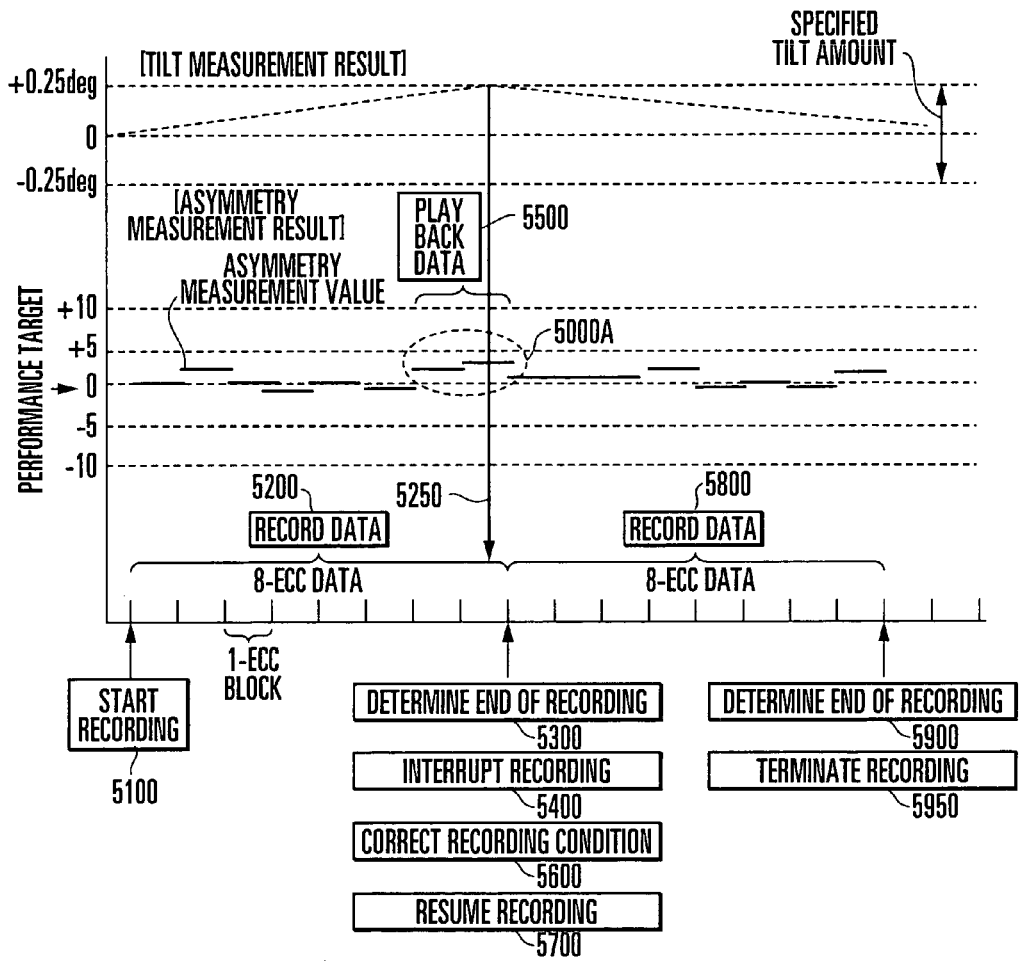
FIG. 24 is a graph for explaining the operation (fifth specific example) of the recording/playback apparatus when a tilt detection signal is used together.

The controller 50 derives a correction value from the deviation amount between the target value and the measurement value, and sets the corrected recording condition as a recording condition in the resumption of recording in the PUH (5600 in FIG. 24). A deviation amount and correction amount were derived from Table 5 which the apparatus had in advance, and as a value which is not present in the table, a value corrected by approximation calculated was used. Since data corresponding to eight ECCs which are scheduled to be recorded are left, recording is resumed (5700 in FIG. 24). When the data corresponding to eight ECCs were recorded (5800 in FIG. 24), recording end determination was performed (5900 in FIG. 24). Since no data scheduled to be recorded is left, the recording is terminated (5950 in FIG. 24). In this manner, stable recording was able to be executed.

TABLE 5

| Disk A | | | | | |
|---|---|---|---|---|---|
| tilt 0deg. | | | | | |
| Asymmetry (%) | −10 | −5 | 0 | +5 | +10 |
| Power (mW) | 5.6 | 5.3 | 5.0 | 4.7 | 4.4 |
| tilt 0.25 deg. | | | | | |
| Asymmetry (%) | −10 | −5 | 0 | +5 | +10 |
| Power (mW) | 5.8 | 5.5 | 5.2 | 4.9 | 4.6 |

In this case, recording and playback are preferably performed on an ECC basis. Predetermined recording interruption conditions include when the recording position on a disk moves away from the recording start position or the position where the previous recording has been interrupted by a predetermined amount or more, when the elapsed time from the previous interruption exceeds a specified value, when the temperature rises to a given point or more, when the recording speed changes, and when a servo parameter changes.

SPECIFIC EXAMPLE 6

Figure 25:
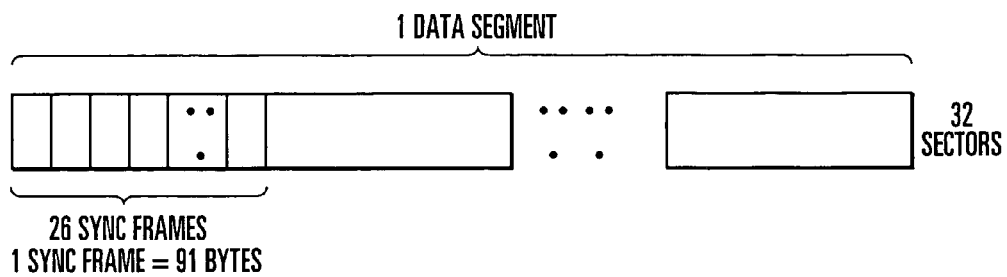
FIG. 25 is a view showing a sector structure.

FIG. 25 shows an example of a sector structure which is one of interruption conditions when the information recording/playback apparatus described in specific example 1 is used. One sync frame is composed of 91 bytes, and one sector is composed of 26 sync frames. In this case as well, 28,000 bits were able to be used for error information, which was sufficient for the calculation of an asymmetry and PRSNR, and hence it was confirmed that the operation described above was realized.

SPECIFIC EXAMPLE 7

Recording was executed by using the information recording/playback apparatus in FIG. 10 in accordance with the sequence shown in FIG. 1 at a shortest bit length of 0.13 μm/bit in (1, 7) RLL with respect to a phase-change disk having a substrate thickness of 0.6 mm with an NA of 0.65 (of the objective lens of an optical head) and an LD wavelength $\lambda$ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk E. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. This operation will be described below with reference to FIG. 27. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Figure 27:
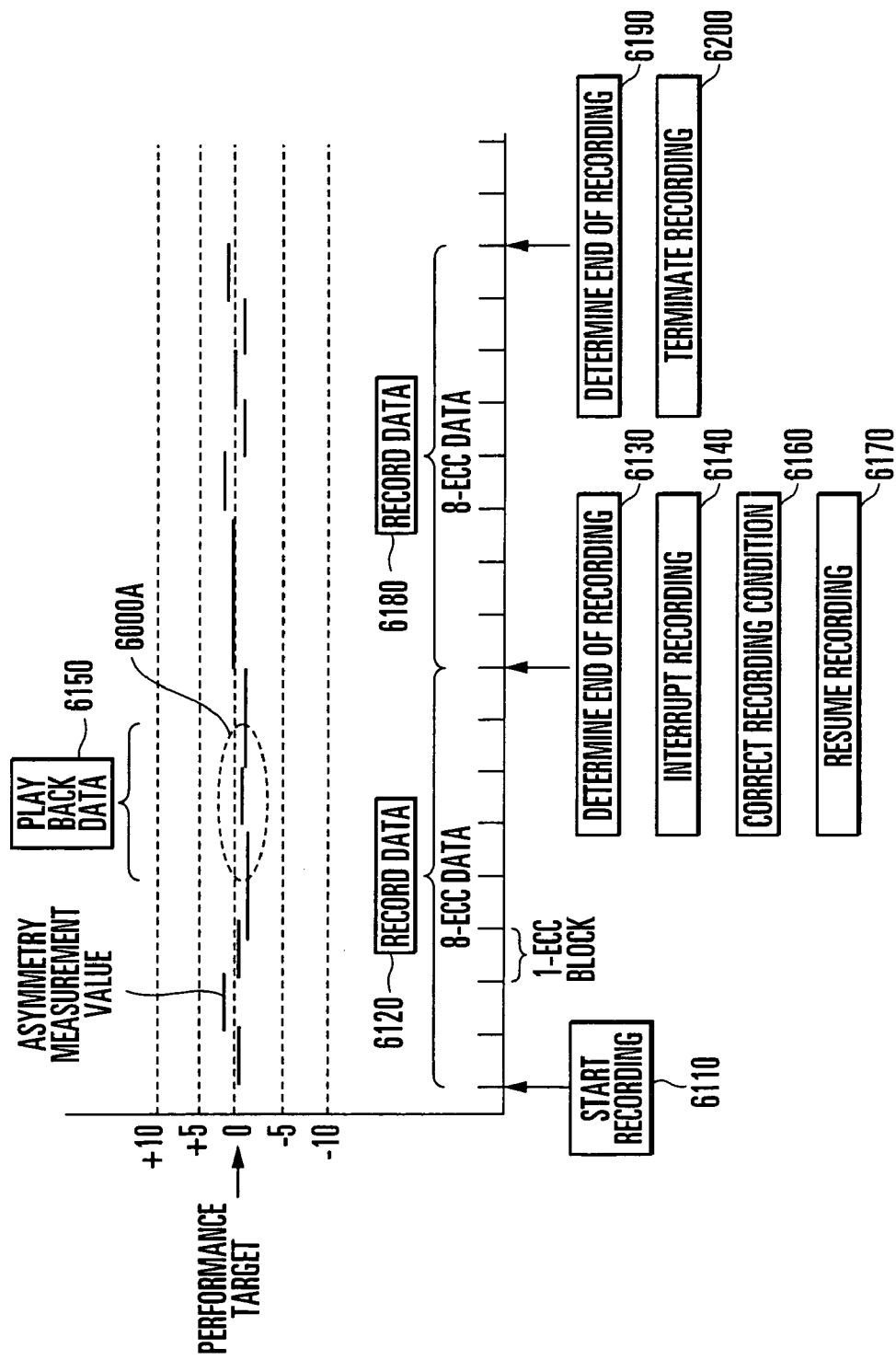
FIG. 27 is a graph showing the operation (seventh specific example) of the recording/playback apparatus in FIG. 10.

Recording is started (6110 in FIG. 27) to record data corresponding to eight ECCs (6120 in FIG. 27). Recording end determination is performed (6130 in FIG. 27). Since data scheduled to be recorded is left, the recording is continued without being ended. The controller 50 also executes interruption determination on an ECC basis. When recording corresponding to eight ECCs is complete, the controller 50 determines whether or not to interrupt the recording (6140 in FIG. 27). Data corresponding to three ECCs of the recorded block are played back (6150 in FIG. 27).

The signal quality detector 40 calculates an asymmetry from the played-back data (the portion enclosed with a dotted line circle 6000A in FIG. 27). For the sake of descriptive convenience, asymmetry measurement values other than those in a portion in which data corresponding to three ECCs immediately before the recording interruption are also presented. The controller 50 derives a correction value from the deviation amount between the target value and the measurement value, and sets the corrected recording condition as a recording condition in the resumption of recording in the PUH 10 (6160 in FIG. 27). A deviation amount and correction amount were derived from Table 6 which the apparatus had in advance, and as a value which is not present in the table, a value corrected by approximation calculated was used. When recording was resumed (6170 in FIG. 27), and data corresponding to eight ECCs are recorded (6180 in FIG. 27), recording end determination is performed (6190 in FIG. 27). Since no data scheduled to be recorded is left, the recording is terminated (6200 in FIG. 27). In this manner, stable recording was able to be executed.

TABLE 6

| Disk E | | | | | |
|---|---|---|---|---|---|
| Asymmetry (%) | −10 | −5 | 0 | +5 | +10 |
| Power (mW) | 4.4 | 4.7 | 5.0 | 5.3 | 5.6 |

SPECIFIC EXAMPLE 8

Figure 26:
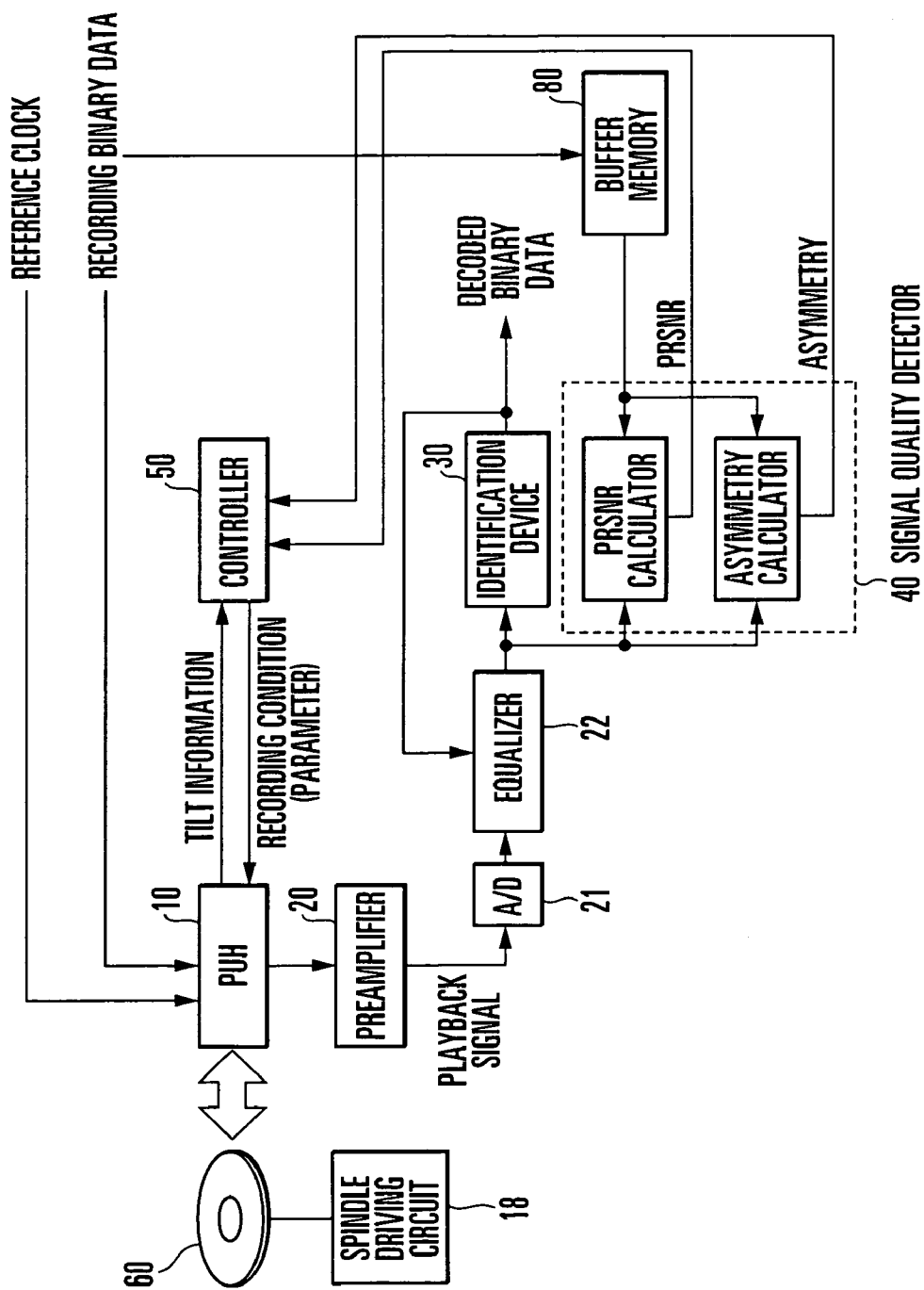
FIG. 26 is a block diagram showing still another example of the information recording/playback apparatus of the present invention.

According to the present invention, effective driving operation can be realized by deriving a reference waveform signal from a recorded data sequence. In this case, as in the recording/playback apparatus shown in FIG. 26, part of data to be recorded (recorded data) is stored in the buffer. When a recorded signal is played back, error information is derived synchronously derived. The operation of the present invention was executed by using the recording/playback apparatus shown in FIG. 26 in accordance with the sequence in FIG. 1. Note that recording/playback was executed by using the information recording/playback apparatus described above at a shortest bit length of 0.13 μm/bit in (1, 7) RLL with respect to a phase-change disk having a substrate thickness of 0.6 mm with an NA of 0.65 (of the objective lens of an optical head) and an LD wavelength $\lambda$ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk F. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. This operation will be described below with reference to FIG. 19. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Recording is started (1101 in FIG. 19) to record data corresponding to eight ECCs (1102 in FIG. 19). Recording end determination is performed (1103 in FIG. 19). Since data scheduled to be recorded is left, the recording is continued without being ended. The controller 50 also executes interruption determination on an ECC basis. When recording corresponding to eight ECCs is complete, the controller 50 determines whether or not to interrupt the recording (1104 in FIG. 19). Data corresponding to two ECCs, including a block immediately before the recording interruption, are played back (1105 in FIG. 19). The signal quality detector 40 calculates an asymmetry from the played-back data (the portion enclosed with a dotted line circle 1000A in FIG. 19) after establishing synchronization between the recording signal playback waveform signal and the reference waveform signal. For the sake of descriptive convenience, asymmetry measurement values other than those in a portion in which data corresponding to two ECCs immediately before the recording interruption are also presented.

The controller 50 derives a correction value from the deviation amount between the target value and the measurement value, and sets the corrected recording condition as a recording condition in the resumption of recording in the PUH 10 (1106 in FIG. 19). A deviation amount and correction amount were derived from Table 7 which the apparatus had in advance, and as a value which was not present in the table, a value corrected by approximation calculated was used. When recording was resumed (1107 in FIG. 19), and data corresponding to eight ECCs are recorded (1108 in FIG. 19), recording end determination was performed (1109 in FIG. 19). Since no data scheduled to be recorded is left, the recording is terminated (1110 in FIG. 19). In this manner, stable recording was able to be executed.

TABLE 7

| Disk F | | | | | |
|---|---|---|---|---|---|
| Asymmetry (%) | −10 | −5 | 0 | +5 | +10 |
| Power (mW) | 5.6 | 5.3 | 5.0 | 4.7 | 4.4 |

SPECIFIC EXAMPLE 9

Consider the error information obtained by error information calculation in each specific example (e.g., A107, B207, C307, D408, E507, or F607). Not only the value of the error information but also information indicating a change in the value of the error information can be used to correct a recording condition. Recording was executed by using the information recording/playback apparatus shown in FIG. 10 in accordance with the sequence shown in FIG. 1 at a shortest bit length of 0.13 µm/bit in (1, 7) RLL with respect to a phase-change disk having a substrate thickness of 0.6 mm with an NA of 0.65 (of the objective lens of an optical head) and an LD wavelength λ of 405 nm. Data were recorded/played back on an ECC basis.

When the optical disk 60 is loaded into the optical disk apparatus, the controller 50 discriminates the type of optical disk, and then adjusts servo parameters. Thereafter, the controller 50 reads various kinds of apparatus control parameter information written on the disk. In this specific example, the finally determined disk was Disk E. A recording condition may be set at this time or when a recording start command is received from the host system.

Upon receiving a recording start command from the host system, the controller 50 starts recording. Assume that data to be recorded are data corresponding to 16 ECCs, and an interruption condition is that data corresponding to eight ECCs are recorded. This operation will be described below with reference to FIG. 28. The abscissa represents the operation of the apparatus on the disk upon data segmentation in ECCs, and the asymmetry measurement results obtained by the signal quality detector 40 which plays back a recorded signal and detects the quality of the played-back signal. The dotted lines extending along the abscissa are criteria of asymmetries of ±5% and ±10%.

Figure 28:
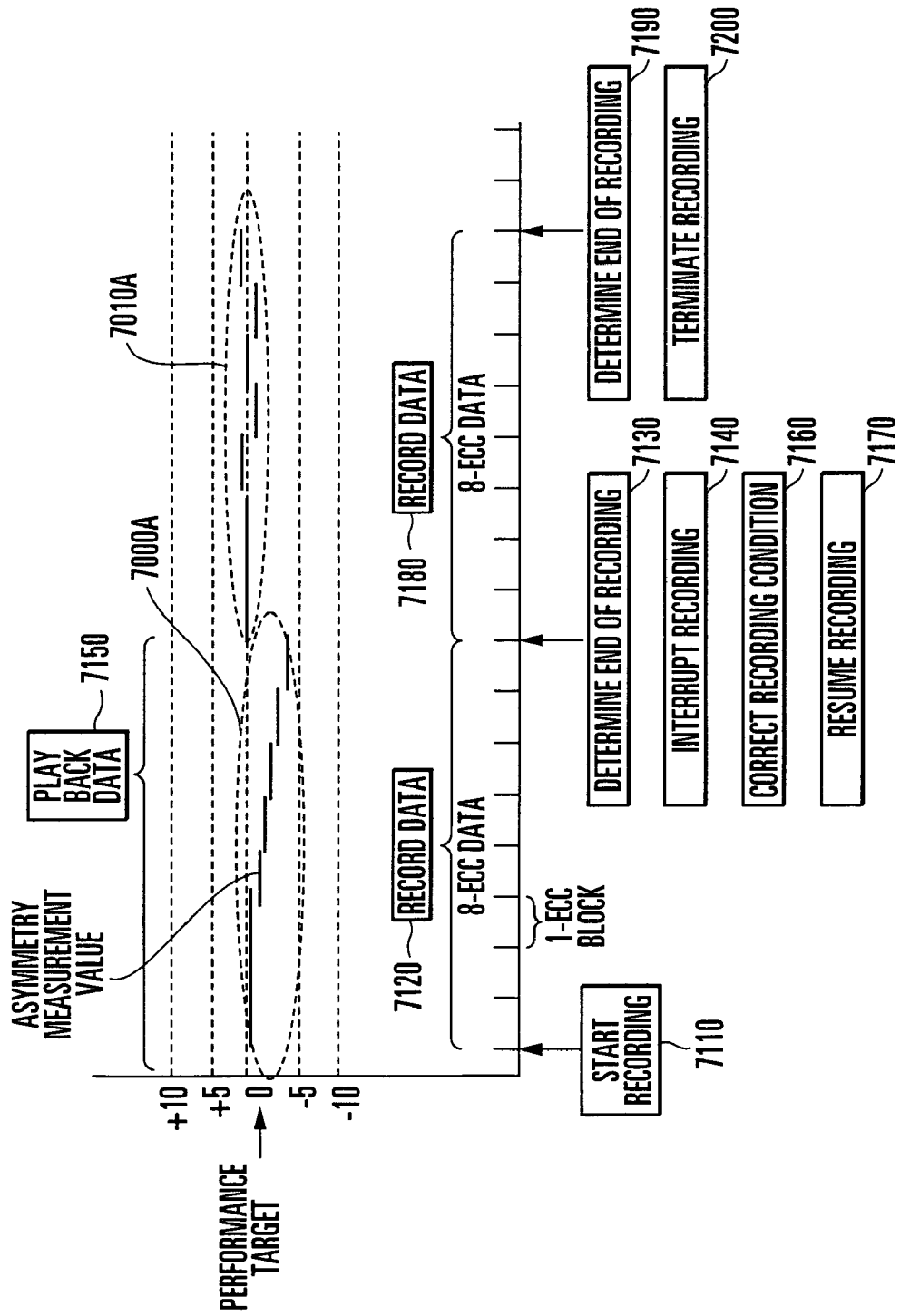
FIG. 28 is a graph showing the operation (ninth specific example) of the recording/playback apparatus in FIG. 26.
Figure 29:
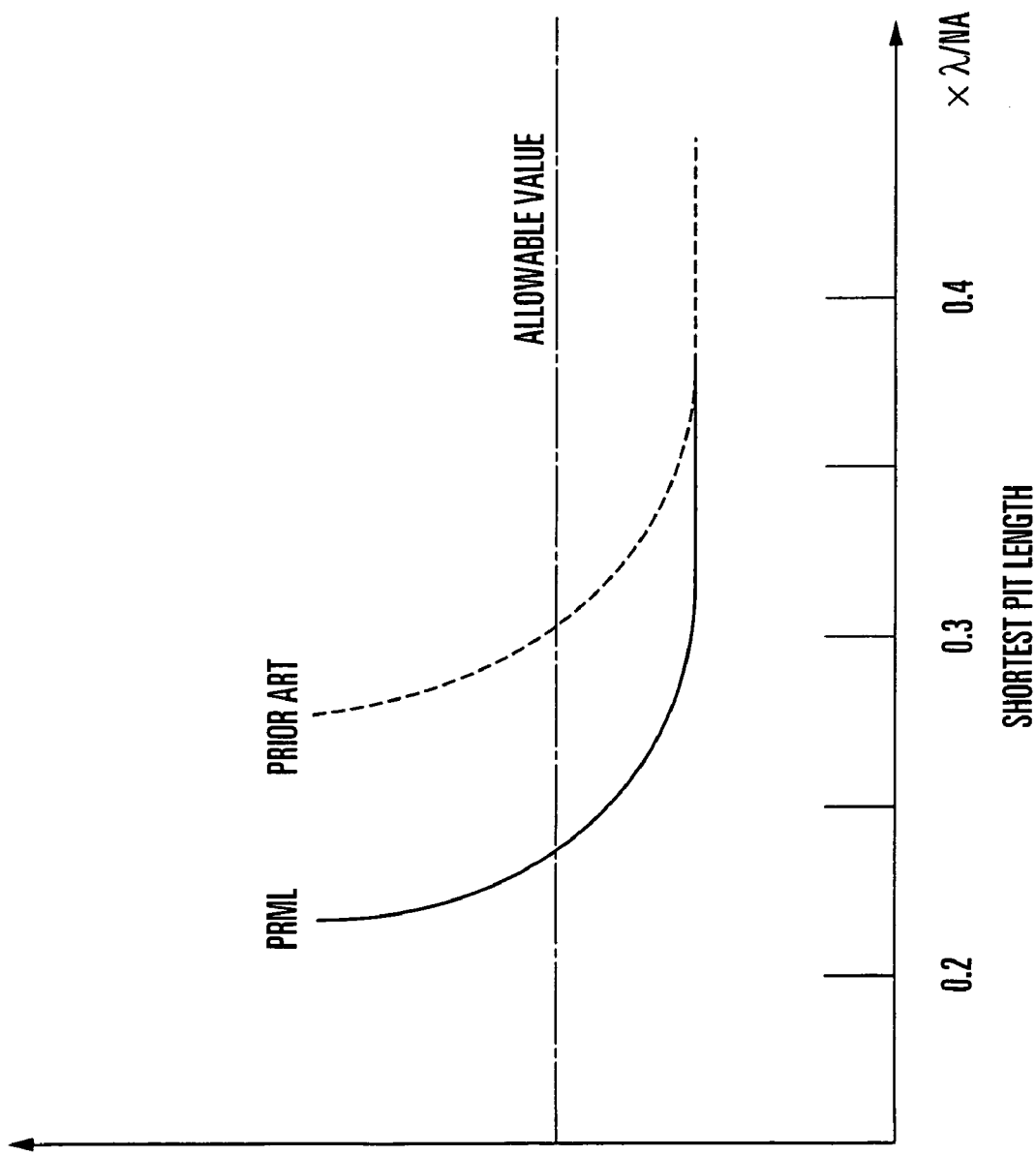
FIG. 29 is a graph showing an example of error rate measurement based on the difference between detection schemes.

Recording is started (7110 in FIG. 28) to record data corresponding to eight ECCs (7120 in FIG. 28). Recording end determination is performed (7130 in FIG. 28). Since data scheduled to be recorded is left, the recording is continued without being ended. The controller 50 also executes interruption determination on an ECC basis. When recording corresponding to eight ECCs is complete, the controller 50 determines whether or not to interrupt the recording (7140 in FIG. 28). The recorded blocks are then played back ECC by ECC from the beginning (7150 in FIG. 28).

The signal quality detector 40 calculates an asymmetry from the played-back data (the portion enclosed with a dotted line circle 7000A in FIG. 28). The controller 50 derives a correction value from the deviation amount between the target value and the measurement value, and sets the corrected recording condition as a recording condition in the resumption of recording in the PUH 10 (7160 in FIG. 28). A deviation amount and correction amount were derived from Table 8 which the apparatus had in advance, and as a value which is not present in the table, a value corrected by approximation calculated was used.

An example of operation in the controller in acquiring error information will be described. When the fourth block is played back, the asymmetry value which has been constant from the first to third blocks begins to decrease. The asymmetry value also decreases at the fifth and sixth blocks. For example, since the asymmetry value shows a decreasing tendency when the third block is played back, the next block is also played back. When the seventh block is played back, the asymmetry value decreases. The eight block is therefore played back. At this time, the playback of the data corresponding to eight blocks is terminated. When it is clear during playback that error information tends to decrease as in this specific example, the playback of the next ECC block is repeated, and it can be adaptively determined which information should be used to correct a recording condition. In addition, in such a case, if the error information shows a decreasing tendency up to the recording end block, a recording condition can be corrected in a feed forward manner by expecting that the error information of blocks scheduled to be recorded next will also decrease. It is also obvious that as information necessary for correction, the information of a recording end portion is more important. Furthermore, if error information on a played-back ECC block basis does not show any decreasing or increasing tendency (the portion enclosed with a dotted line circle 7010A in FIG. 28), the information is averaged.

Subsequently, recording was resumed (7170 in FIG. 28). When data corresponding to eight ECCs have been recorded (7180 in FIG. 28), recording end determination is performed (7190 in FIG. 28). Since no data scheduled to be recorded was left, the recording was terminated (7200 in FIG. 28). In this manner, stable recording was able to be executed.

TABLE 8

| Disk E | | | | | |
|---|---|---|---|---|---|
| Asymmetry (%) | −10 | −5 | 0 | +5 | +10 |
| Power (mW) | 4.4 | 4.7 | 5.0 | 5.3 | 5.6 |

The above description has exemplified the relationship between powers and asymmetries in a recording condition. However, as an example of the relationship between a recording strategy and an asymmetry, the relationship between the following recording strategy (e.g., the start pulse width Ttop of a shortest mark as one of strategy parameters) may be used.

TABLE 9

(at recording power of 5.0 mW)

| Asymmetry (%) | −10 | −5 | 0 | +5 | +10 |
|---|---|---|---|---|---|
| Ttop (%) | 90 | 95 | 100 | 105 | 110 |

According to the information recording medium recording method, information recording/playback apparatus, and information recording medium according to the present invention, the following effects can be obtained.

The first effect of the present invention is that the recording quality in continuous recording can be kept constant. The following is the reason for this effect. Recording is interrupted during data recording, and a portion actually recorded is played back. The recording quality of the played-back portion is then evaluated. After a recording condition is corrected on the basis of the evaluation result, recording is resumed.

The second effect of the present invention is that correction by recording interruption and resumption in continuous recording can be executed at proper timings as required. This is because interruption intervals and interruption count can be adaptively added and changed in accordance with the recording state.

The third effect of the present invention is that even if recording interruption and resumption are executed in continuous recording, no trouble occurs in the exchange of information with the host system. This is because status information indicating a recording interruption or resumption state is notified to the host system.

What is claimed is:

1. An information recording medium recording method comprising the steps of:
   interrupting recording, in recording on an information recording medium, when a predetermined interruption condition is met, wherein the predetermined interruption condition is a condition for interrupting recording at one of a sector end portion, an ECC block end, and a boundary where a rotational speed of the information recordina medium changes;
   playing back a signal recorded in a recorded area and obtaining a recording signal playback waveform signal;
   obtaining error information indicating an error between a reference waveform signal derived by partial response equalization of a data string and the recording signal playback waveform signal; and
   correcting a recording condition on the basis of the error information.

2. A method according to claim 1, wherein the data string is an estimated data string acquired by making the recording signal playback waveform signal pass through an identification device.

3. A method according to claim 2, wherein the estimated data string is data binarized by a Viterbi decoder.

4. A method according to claim 1, wherein the data string is a recording data string recorded on the information recording medium.

5. A method according to claim 4, wherein the signal recorded in the recorded area includes a signal recorded immediately before the recording is interrupted.

6. A method according to claim 1, further comprising the step of adding a new condition to the interruption condition or changing the interruption condition on the basis of the error information.

7. A method according to claim 1, wherein in at least one of the respective steps, status information indicating a recording operation state is notified to a host system which transmits a record command and a signal to be recorded.

8. A method according to claim 1, further comprising the step of executing recording/playback characteristic correlation learning operation of obtaining the error information with respect to a signal recorded under different recording conditions and obtaining a correlation relationship between each of the recording conditions and the error information corresponding to the signal,
   wherein the recording condition is corrected on the basis of the correlation relationship acquired by the recording/playback characteristic correction learning operation.

9. A method according to claim 1, further comprising the step of executing recording/playback characteristic correlation learning operation of obtaining the error information with respect to a signal recorded under different recording conditions and obtaining a correlation relationship between each of the recording conditions and the error information corresponding to the signal after interruption of the recording and before correction of the recording condition,
   wherein the recording condition is corrected on the basis of the correlation relationship acquired by the recording/playback characteristic correction learning operation.

10. A method according to claim 9, wherein the recording condition is corrected by using the correlation relationship acquired by the recording/playback characteristic correlation learning operation as a correlation relationship between error information and a recording condition in a case in which recording is interrupted after acquisition of the correlation relationship.

11. A method according to claim 1, wherein the error information includes at least one of an asymmetry value and an SNR value.

12. A method according to claim 1, wherein the recording method is a method of optically recording information by focusing a light beam from a laser light source through an objective lens and applying the light beam on a recording medium layer,
   the recorded signal is played back by applying the light beam onto the recording medium layer and reading, as the recorded signal, marks and spaces recorded on the recording medium layer by using reflected light from the recording medium layer, and
   a smallest value of polarity inversion intervals of a signal recorded on the recording medium is smaller than 0.35 × λ/NA where λ is a laser wavelength of a light source and NA is an objective lens numerical aperture.

13. An information recording/playback apparatus including at least error calculation means for calculating error information indicating an error between a reference waveform signal derived by partial response equalization of a data string and a recording signal playback waveform signal, and control means,
   said control means executing at least
   a process of interrupting recording, in recording on an information recording medium, when a predetermined interruption condition is met, wherein the predetermined interruption condition is a condition for interrupting recording at one of a sector end portion, an ECC block end, and a boundary where a rotational speed of the information recording medium changes, a process of playing back a signal recorded in a recorded area and obtaining the recording signal playback waveform signal, a process of causing said error calculation means to calculate the error information, and a process of correcting a recording condition by using the error information.

14. An apparatus according to claim 13, wherein the data string is output from a decoder unit which estimates a data string from a recording signal playback waveform signal obtained by playing back a signal recorded in a recorded area.

15. An apparatus according to claim 14, wherein the estimated data string estimated by the decoder unit is data binarized by a Viterbi decoder.

16. An apparatus according to claim 14, further comprising storage means for storing the data string which is to be recorded/was recorded on the information recording medium.

17. An apparatus according to claim 13, wherein the signal recorded in the recorded area includes a signal recorded immediately before the recording is interrupted.

18. An apparatus according to claim 13, wherein said control means performs a process of adding a new condition to the interruption condition or changing the interruption condition on the basis of the error information.

19. An apparatus according to claim 13, wherein said control means has a function of notifying status information indicating a recording operation state to a host system which transmits a record command and a signal to be recorded while executing at least one of the respective processes.

20. An apparatus according to claim 13, wherein said control means executes recording/playback characteristic correlation learning operation of obtaining the error information with respect to a signal recorded under different recording conditions and obtaining a correlation relationship between each of the recording conditions and the error information corresponding to the signal, and the recording condition is corrected on the basis of the correlation relationship acquired by the recording/playback characteristic correction learning operation.

21. An apparatus according to claim 13, wherein said control means executes recording/playback characteristic correlation learning operation of obtaining the error information with respect to a signal recorded under different recording conditions and obtaining a correlation relationship between each of the recording conditions and the error information corresponding to the signal after interruption of the recording and before correction of the recording condition, and the recording condition is corrected on the basis of the correlation relationship acquired by the recording/playback characteristic correction learning operation.

22. An apparatus according to claim 21, wherein said control means corrects the recording condition by using the correlation relationship acquired by the recording/playback characteristic correlation learning operation as a correlation relationship between error information and a recording condition in a case in which recording is interrupted after acquisition of the correlation relationship.

23. An apparatus according to claim 13, wherein the error information includes at least one of an asymmetry value and an SNR value.

24. An apparatus according to claim 13, wherein said recording/playback apparatus optically records information by focusing a light beam from a laser light source through an objective lens and applying the light beam on a recording medium layer, and plays back the recorded signal by applying the light beam onto the recording medium layer and reading, as the recorded signal, marks and spaces recorded on the recording medium layer by using reflected light from the recording medium layer, and a smallest value of polarity inversion intervals of a signal recorded on the recording medium is smaller than 0.35 ×λ/NA where λ is a laser wavelength of a light source and NA is an objective lens numerical aperture.

25. An information recording medium on which a signal is recorded by a recording method including the steps of interrupting an ongoing recording, in recording on an information recording medium, when a predetermined interruption condition is met, playing back a signal recorded in a recorded area and obtaining a recording signal playback waveform signal, obtaining error information indicating an error between a reference waveform signal derived by partial response equalization of a data string and the recording signal playback waveform signal, and correcting a recording condition on the basis of the error information.

26. A medium according to claim 25, wherein at least one of an amplitude, an SNR value, and an asymmetry value of the recording signal playback waveform signal changes before and after recording interruption.

* * * * *